United States Patent
Chen et al.

(10) Patent No.: US 11,385,602 B2
(45) Date of Patent: Jul. 12, 2022

(54) SYSTEM CONTROL METHOD AND APPARATUS, CONTROLLER, AND CONTROL SYSTEM

(71) Applicant: HUAWEI TECHNOLOGIES CO., LTD., Guangdong (CN)

(72) Inventors: Zhitang Chen, Shenzhen (CN); Baofeng Zhang, Shenzhen (CN); Yanhui Geng, Montreal (CA)

(73) Assignee: Huawei Technologies Co., Ltd., Guangdong (CN)

( * ) Notice: Subject to any disclaimer, the term of this patent is extended or adjusted under 35 U.S.C. 154(b) by 1205 days.

(21) Appl. No.: 15/880,696

(22) Filed: Jan. 26, 2018

(65) Prior Publication Data
US 2018/0150035 A1 May 31, 2018

Related U.S. Application Data

(63) Continuation of application No. PCT/CN2016/090520, filed on Jul. 19, 2016.

(30) Foreign Application Priority Data

Jul. 27, 2015 (CN) .......................... 201510447521.6

(51) Int. Cl.
*G05B 13/02* (2006.01)
*G05B 13/04* (2006.01)
*G06N 3/12* (2006.01)

(52) U.S. Cl.
CPC ......... *G05B 13/0265* (2013.01); *G05B 13/04* (2013.01); *G05B 13/048* (2013.01); *G06N 3/126* (2013.01)

(58) Field of Classification Search
CPC .. G05B 13/0265; G05B 13/04; G05B 13/048; G06N 3/126
See application file for complete search history.

(56) References Cited

U.S. PATENT DOCUMENTS

2004/0030420 A1* 2/2004 Ulyanov ............ G05B 13/0285
706/2
2004/0077090 A1* 4/2004 Short ................. C12N 15/1027
435/254.2
(Continued)

FOREIGN PATENT DOCUMENTS

CN 1311880 A 9/2001
CN 101604409 A 12/2009
(Continued)

OTHER PUBLICATIONS

Office Action issued in Chinese Application No. 201510447521.6 dated Dec. 3, 2020, 4 pages.
(Continued)

*Primary Examiner* — Ziaul Karim
(74) *Attorney, Agent, or Firm* — Fish & Richardson P.C.

(57) ABSTRACT

A system control method includes receiving a control task and randomly selecting a chromosome from an evolution pool according to the control task. The selected chromosome is decoded to obtain (N+1) ensemble policies, where the chromosome includes (N+1) gene fragments, and where N is a positive integer greater than or equal to 1. Each gene fragment can uniquely correspond to an ensemble policy, and each ensemble policy can uniquely correspond to a preset function. One ensemble policy is used for assigning a weight to a preset function that uniquely corresponds to the ensemble policy. The evolution pool can maintain two or more chromosomes. An ensemble calculation is performed according to weights assigned by the (N+1) ensemble policies to obtain an ensemble control output. A control signal is generated according to the ensemble control output, where the control signal is used for performing system control.

15 Claims, 12 Drawing Sheets

(56) References Cited

U.S. PATENT DOCUMENTS

| | | | | |
|---|---|---|---|---|
| 2005/0100232 A1* | 5/2005 | Sakanashi | ............... | H04N 1/417 382/238 |
| 2007/0282666 A1* | 12/2007 | Afeyan | ................. | G06N 7/005 706/13 |
| 2013/0173510 A1* | 7/2013 | Schmid, Jr. | ............ | G06N 3/126 706/13 |
| 2014/0279783 A1* | 9/2014 | Bilal | .................... | G05B 13/048 706/46 |
| 2014/0287934 A1* | 9/2014 | Szelinger | ............... | G16B 30/10 702/19 |

FOREIGN PATENT DOCUMENTS

| | | | |
|---|---|---|---|
| CN | 102540879 | A | 7/2012 |
| CN | 103346904 | A | 10/2013 |
| CN | 103596652 | A | 2/2014 |
| CN | 104460514 | A | 3/2015 |
| CN | 104573857 | A | 4/2015 |
| CN | 104616062 | A | 5/2015 |
| EP | 1251459 | A2 | 10/2002 |
| EP | 3016316 | B1 | 9/2017 |
| WO | 2005081902 | A2 | 9/2005 |

OTHER PUBLICATIONS

Xue et al., "A new fracture prediction method by combining genetic algorithm with neural network in low-permeability reservoirs," Journal of Petroleum Science and Engineering, vol. 121, Sep. 2014, 8 pages.

Zhang Hao et al, Design of Depth Controller of Autonomous Underwater Vehicle Based on Genetic Algorithms. Journal of Projectiles,Rockets,Missiles and Guidance, vol. 25, No. 4, Dec. 31, 2005, 3 pages.

Xu Liang et al, Prediction of Steel Arch Stress in Tunnel Initial Support Based on GA-BP Neural Network. Journal of Beihua University( Natural Science), vol. 13, No. 6, Dec. 2012, 5 pages.

Office Action issued in Chinese Application No. 201510447521 dated Nov. 5, 2018, 4 pages.

Search Report issued in Chinese Application No. 2015104475216 dated Oct. 26, 2018, 2 pages.

Extended European Search Report issued in European Application No. 16829783.6 dated Jun. 12, 2018, 5 pages.

International Search Report and Written Opinion in International Application No. PCT/CN2016/090520, dated Oct. 25, 2016, 26 pages.

Li, "Fuzzy Control—Neurocontrol and intelligent Cybernetics," Harbin Institute of Technology Press, Oct. 1996, 11 pages (partial English translation).

Ruan et al., "New Development of Blind Processing Technology in Modern Wireless Communication System," Jan. 2015. total 5 pages. (with English abstract).

Office Action issued in Chinese Application No. 201510447521.6 dated Jul. 8, 2019, 8 pages.

Officed Action issued in Indian Application No. 201837003710 dated Nov. 3, 2020, 7 pages.

* cited by examiner

SYSTEM CONTROL METHOD AND APPARATUS, CONTROLLER, AND CONTROL SYSTEM

CROSS-REFERENCE TO RELATED APPLICATIONS

This application is a continuation of International Application No. PCT/CN2016/090520, filed on Jul. 19, 2016, which claims priority to Chinese Patent Application No. 201510447521.6, filed on Jul. 27, 2015. The disclosures of the aforementioned applications are hereby incorporated by reference in their entireties.

TECHNICAL FIELD

Embodiments of the present disclosure relate to the electricity field, and more specifically, to a system control method and apparatus, a system, and a controller to which the control method is applied.

BACKGROUND

Control theories are successfully applied to many industrial production processes, the aviation field, urban transportation management, and even enterprise performance management. A complete control system includes a control input, a controller, and a controlled object or a controlled process. The control input is a state that the controlled object is expected to be capable of reaching. The controlled object is a controlled device or process. The controller is a device that accepts the control input, generates a control signal by using an algorithm or a policy, and applies the control signal to the controlled object or the controlled process. The control system may be classified into an open-loop control system (open-loop control system) and a closed-loop control system (closed-loop control system). As shown in FIG. 1, there is no feedback between an output end and an input end of an open-loop control system, and the open-loop control system has advantages such as simplicity and economy. However, the open-loop control system also has disadvantages such as a long response time and poor interference immunity. As feedback is introduced, a closed-loop control system effectively overcomes the disadvantages of the open-loop control system. As shown in FIG. 2, a closed-loop control system generates a corresponding control signal by using a deviation obtained by means of comparison between a system behavior, that is, a system output, and an expected behavior, that is, an input, and eliminates the deviation, to achieve an objective of control. Compared with the open-loop control system, a closed-loop control system has advantages such as quick responsiveness, immunity to interference, and insensitivity to element characteristics. In terms of a feedback principle for closed-loop control, the closed-loop control system has a capability of self-adjustment, and therefore, has adaptability to some extent. However, in the closed-loop control system, design of a controller usually depends on accurate system identification of a controlled object. System identification (system identification) of a controlled object refers to a parameterized or non-parameterized description of a system behavior. In the prior art, model parameters of a controlled object are usually estimated/identified by using a particular method, and then a corresponding controller is designed according to a model constructed from these model parameters. The controller obtained by using the method usually cannot obtain desired control performance unless the controlled object can be accurately identified. In addition, an excellent control effect can be achieved only when the model parameters of the controlled object fall within a particular range. However, the estimation/identification of the model parameters of the controlled object is a very challenging problem. In an existing system identification method, a hypothesis usually needs to be proposed for a model characteristic, so as to estimate model parameters. For example, in a linear auto regressive-moving average (ARMA) model, it is assumed that an input and an output of a system satisfy the following relationship:

$$r(t) = \sum_{i=1}^{p} a_i r(t-i) + \sum_{j=1}^{q} \beta_j \varepsilon(t-j) + \varepsilon(t).$$

Herein, $p, q, \alpha_i, \beta_j$ are model parameters of the system, and all the model parameters need to be obtained by means of estimation by using a particular method. In the model, it is assumed that the relationship is linear, and it is also assumed that the model parameters are fixed and do not change with time. However, these hypotheses usually hardly hold true in a complex control process in reality. In addition, even if these model hypotheses hold true, estimated values usually deviate from true values when parameter estimation is performed on a limited data set. Moreover, because the controlled object is usually further affected by external disturbance, the model parameters of the system are also affected. As a result, a controller designed based on a model obtained by means of system identification of a controlled object usually can achieve a desired control effect only in a particular scenario, but cannot adjust a control policy adaptively.

SUMMARY

Embodiments of the present disclosure provide a system control method and apparatus, a system, and a controller, so that a complete and dynamic control system, apparatus, and method are provided for a complex control environment in reality, to improve adaptability of a control system, thereby improving control efficiency.

According to a first aspect, an embodiment of the present disclosure provides a control system, including a receiver, a genetic evolution module, a control decision ensemble module, N function modules, a controller, and a controlled object, where the receiver is configured to receive a control task;

the genetic evolution module is configured to: randomly select a chromosome from an evolution pool according to the control task, and decode the chromosome to obtain (N+1) ensemble policies, where the chromosome includes (N+1) gene fragments, the (N+1) gene fragments respectively include ensemble policies that correspond one-to-one to the control decision ensemble module and the N function modules, the evolution pool maintains two or more chromosomes, and N is a positive integer greater than or equal to 1;

the N function modules are configured to perform an ensemble calculation respectively according to ensemble policies that correspond one-to-one to the N function modules, to obtain N calculation outputs;

the control decision ensemble module is configured to perform an ensemble calculation according to the N calculation outputs and an ensemble policy that corresponds one-to-one to the control decision ensemble module, to obtain an ensemble control output; and the controller is configured to: generate a control signal according to the ensemble control output, and control the controlled object by using the control signal.

With reference to the first aspect, in a first possible implementation manner of the first aspect, the $n^{th}$ function module of the N function modules includes $M_n$ algorithms, $M_n$ is a positive integer greater than or equal to 2, $1 \leq n \leq N$, the $M_n$ algorithms are used for separately and independently implementing a specific function of the function module, and the $n^{th}$ function module is any one of the N function modules; and correspondingly, that the N function modules are configured to perform an ensemble calculation respectively according to ensemble policies that correspond one-to-one to the N function modules, to obtain N calculation outputs includes:

the $n^{th}$ function module is configured to perform an ensemble calculation on the $M_n$ algorithms according to an ensemble policy that corresponds one-to-one to the $n^{th}$ function module, to obtain one calculation output.

With reference to the first possible implementation manner of the first aspect, in a second possible implementation manner of the first aspect, the $n^{th}$ ensemble policy of the (N+1) ensemble policies that corresponds one-to-one to the $n^{th}$ function module includes $M_n$ ensemble calculation weighting coefficients, and the $M_n$ ensemble calculation weighting coefficients are used for respectively assigning weights to the $M_n$ algorithms included in the $n^{th}$ function module.

With reference to the second possible implementation manner of the first aspect, in a third possible implementation manner of the first aspect, the $n^{th}$ function module of the N function modules is configured to:

perform calculations respectively according to the $M_n$ algorithms included in the $n^{th}$ function module, to obtain $M_n$ calculation results, and perform a weighted ensemble calculation on the $M_n$ calculation results according to the $M_n$ ensemble calculation weighting coefficients included in the $n^{th}$ ensemble policy, to obtain one calculation output.

With reference to any one of the first possible implementation manner of the first aspect to the third possible implementation manner of the first aspect, in a fourth possible implementation manner of the first aspect, if N=1, and n=1, the N function modules are a controlled object state estimation/prediction ensemble module; and the controlled object state estimation/prediction ensemble module includes $M_1$ first algorithms, where the $M_1$ first algorithms are used for separately and independently implementing a function of estimating/predicting a state of the controlled object.

With reference to any one of the first possible implementation manner of the first aspect to the third possible implementation manner of the first aspect, in a fifth possible implementation manner of the first aspect, if N=2, and n=1 or 2, the N function modules are respectively a controlled object state estimation/prediction ensemble module and an external event or interference prediction/classification ensemble module;

the controlled object state estimation/prediction ensemble module includes $M_1$ first algorithms, where the $M_1$ first algorithms are used for separately and independently implementing a function of estimating/predicting a state of the controlled object; and the external event or interference prediction/classification ensemble module includes $M_2$ second algorithms, where the $M_2$ second algorithms are used for separately and independently implementing a function of predicting or classifying an external event or interference.

With reference to any one of the first aspect or the first possible implementation manner of the first aspect to the fifth possible implementation manner of the first aspect, in a sixth possible implementation manner of the first aspect, the control decision ensemble module includes H algorithms, the H algorithms are used for separately and independently implementing a function of the control decision ensemble module, and H is a positive integer greater than or equal to 2.

With reference to the sixth possible implementation manner of the first aspect, in a seventh possible implementation manner of the first aspect, the ensemble policy of the (N+1) ensemble policies that corresponds one-to-one to the control decision ensemble module includes H ensemble calculation weighting coefficients, and the H ensemble calculation weighting coefficients are used for respectively assigning weights to the H algorithms included in the control decision ensemble module.

With reference to the seventh possible implementation manner of the first aspect, in an eighth possible implementation manner of the first aspect, the control decision ensemble module is configured to:

perform calculations on the N calculation outputs respectively according to the H algorithms included in the control decision ensemble module, to obtain H control outputs; and perform a weighted ensemble calculation on the H control outputs according to the H ensemble calculation weighting coefficients included in the ensemble policy that corresponds one-to-one to the control decision ensemble module, to obtain the ensemble control output.

With reference to any one of the first aspect or the first possible implementation manner of the first aspect to the eighth possible implementation manner of the first aspect, in a ninth possible implementation manner of the first aspect, the controller is further configured to: when the control task ends, collect a control effect that is obtained according to control of the control signal, where the control effect is measured according to a deviation between an expected control result and an actual control result of the control system;

convert the control effect into fitness of the chromosome, where the fitness is used for indicating a probability that an evolution operation is performed on the chromosome; and send the fitness to the genetic evolution module, so that the genetic evolution module performs an evolution operation on the chromosome according to the fitness, where the evolution operation includes genetic reproduction or genetic crossover.

According to a second aspect, an embodiment of the present disclosure provides a system control method, where the method includes:

receiving a control task;

randomly selecting a chromosome from an evolution pool according to the control task, and decoding the chromosome to obtain (N+1) ensemble policies, where the chromosome includes (N+1) gene fragments, each gene fragment uniquely corresponds to an ensemble policy, each ensemble policy uniquely corresponds to a preset function, one ensemble policy is used for assigning a weight to a preset function that uniquely corresponds to the ensemble policy, the evolution pool maintains two or more chromosomes, and N is a positive integer greater than or equal to 1;

performing an ensemble calculation according to weights assigned by the (N+1) ensemble policies, to obtain an ensemble control output; and generating a control signal according to the ensemble control output, where the control signal is used for performing system control.

With reference to the second aspect, in a first possible implementation manner of the second aspect, the performing an ensemble calculation according to weights assigned by the (N+1) ensemble policies, to obtain an ensemble control output includes:

separately performing calculations according to weights assigned by N of the (N+1) ensemble policies, to obtain N calculation outputs; and performing an ensemble calculation according to the N calculation outputs and one of the (N+1) ensemble policies other than the N ensemble policies, to obtain the ensemble control output.

With reference to the first possible implementation manner of the second aspect, in a second possible implementation manner of the second aspect, that each gene fragment uniquely corresponds to an ensemble policy, each ensemble policy uniquely corresponds to a preset function, and one ensemble policy is used for assigning a weight to a preset function that uniquely corresponds to the ensemble policy includes:

objects with weights assigned are $M_n$ algorithms, where the $M_n$ algorithms are used for separately and independently implementing the preset function that uniquely corresponds to the ensemble policy; and each ensemble policy includes $M_n$ ensemble calculation weighting coefficients, where the $M_n$ ensemble calculation weighting coefficients are used for respectively assigning the weights to the $M_n$ algorithms, $M_n$ is a positive integer greater than or equal to 2, $1 \leq n \leq N$, and n is used for indicating serial numbers of different ensemble policies.

With reference to the second possible implementation manner of the second aspect, in a third possible implementation manner of the second aspect, the separately performing calculations according to weights assigned by N of the (N+1) ensemble policies, to obtain N calculation outputs includes:

performing the following step for the $n^{th}$ ensemble policy of the N ensemble policies: performing a weighted ensemble calculation on the $M_n$ algorithms according to the $M_n$ ensemble calculation weighting coefficients, to obtain one calculation output, where the one calculation output is used for indicating an output of a preset function that uniquely corresponds to the $n^{th}$ ensemble policy, and the $n^{th}$ ensemble policy is any one of the N ensemble policies.

With reference to any one of the second aspect or the first possible implementation manner of the second aspect to the third possible implementation manner of the second aspect, in a fourth possible implementation manner of the second aspect, after the generating a control signal according to the ensemble control output, the method further includes:

collecting a control effect that is obtained according to control of the control signal, where the control effect is measured according to a deviation between an expected control result and an actual control result of a control system; and converting the control effect into fitness of the chromosome, where the fitness is used for indicating a probability that an evolution operation is performed on the chromosome, and the evolution operation includes genetic reproduction or genetic crossover.

According to a third aspect, an embodiment of the present disclosure provides a system control method, applied to any one of the first aspect to the ninth possible implementation manner of the first aspect, where the method includes:

receiving a control task;

randomly selecting a chromosome from an evolution pool according to the control task, and decoding the chromosome to obtain (N+1) ensemble policies, where the chromosome includes (N+1) gene fragments, the (N+1) gene fragments respectively include ensemble policies that correspond one-to-one to a control decision ensemble module and N function modules in the control system, the evolution pool maintains two or more chromosomes, and N is a positive integer greater than or equal to 1;

performing an ensemble calculation respectively according to ensemble policies that correspond one-to-one to the N function modules in the control system, to obtain N calculation outputs;

performing an ensemble calculation according to the N calculation outputs and an ensemble policy that corresponds one-to-one to the control decision ensemble module in the control system, to obtain an ensemble control output; and generating a control signal according to the ensemble control output, and controlling a controlled object by using the control signal.

According to a fourth aspect, an embodiment of the present disclosure provides a system control method, where the method includes:

randomly selecting a chromosome from an evolution pool according to a received control task;

decoding the chromosome to obtain (N+1) ensemble policies, where the chromosome includes (N+1) gene fragments, each gene fragment uniquely corresponds to an ensemble policy, each ensemble policy uniquely corresponds to a preset function, one ensemble policy is used for assigning a weight to a preset function that uniquely corresponds to the ensemble policy, the evolution pool maintains two or more chromosomes, and N is a positive integer greater than or equal to 1; and sending the (N+1) ensemble policies.

With reference to the fourth aspect, in a first possible implementation manner of the fourth aspect, that each gene fragment uniquely corresponds to an ensemble policy, each ensemble policy uniquely corresponds to a preset function, and one ensemble policy is used for assigning a weight to a preset function that uniquely corresponds to the ensemble policy includes:

objects with weights assigned are $M_n$ algorithms, where the $M_n$ algorithms are used for separately and independently implementing the preset function that uniquely corresponds to the ensemble policy; and each ensemble policy includes $M_n$ ensemble calculation weighting coefficients, where the $M_n$ ensemble calculation weighting coefficients are used for respectively assigning the weights to the $M_n$ algorithms, $M_n$ is a positive integer greater than or equal to 2, $1 \leq n \leq N$, and n is used for indicating serial numbers of different ensemble policies.

With reference to the fourth aspect or the first possible implementation manner of the fourth aspect, in a second possible implementation manner of the fourth aspect, the method further includes:

receiving fitness, where the fitness is obtained by converting a control effect, the control effect is measured according to a deviation between an expected control result and an actual control result of a control system, the fitness is used for indicating a probability that an evolution operation is performed on the chromosome, and the evolution operation includes genetic reproduction or genetic crossover.

According to a fifth aspect, an embodiment of the present disclosure provides a system control method, applied to any one of the first aspect to the ninth possible implementation manner of the first aspect, where the method includes:

randomly selecting a chromosome from an evolution pool according to a received control task;

decoding the chromosome to obtain (N+1) ensemble policies, where the chromosome includes (N+1) gene fragments, the (N+1) gene fragments respectively include ensemble policies that correspond one-to-one to a control decision ensemble module and N function modules in the control system, the evolution pool maintains two or more chromosomes, and N is a positive integer greater than or equal to 1; and sending the (N+1) ensemble policies, so that the control system performs ensemble control according to the (N+1) ensemble policies.

According to a sixth aspect, an embodiment of the present disclosure provides a system control method, where the method includes:

receiving an ensemble policy, where the ensemble policy includes H ensemble calculation weighting coefficients, and H is a positive integer greater than or equal to 2;

receiving N calculation outputs, where the N calculation outputs are N calculation result outputs that respectively correspond one-to-one to N preset functions;

performing an ensemble calculation according to the N calculation outputs and the ensemble policy, to obtain an ensemble control output; and sending the ensemble control output, where the ensemble control output is used for generating a control signal, and the control signal is used for performing system control.

With reference to the sixth aspect, in a first possible implementation manner of the sixth aspect, the H ensemble calculation weighting coefficients are specifically used for respectively assigning weights to H algorithms, and the H algorithms are used for separately and independently performing calculations to obtain the ensemble control output; and the performing an ensemble calculation according to the N calculation outputs and the ensemble policy, to obtain an ensemble control output includes:

performing calculations on the N calculation outputs respectively according to the H algorithms, to obtain H control outputs; and performing a weighted ensemble calculation on the H control outputs according to the H ensemble calculation weighting coefficients included in the ensemble policy, to obtain the ensemble control output.

With reference to the sixth aspect or the first possible implementation manner of the sixth aspect, in a second possible implementation manner of the sixth aspect, the method further includes:

feeding back a control effect that is obtained according to control of the control signal, where the control effect is measured according to a deviation between an expected control result and an actual control result of a control system, the control effect is used for being converted into fitness of the chromosome, the fitness is used for indicating a probability that an evolution operation is performed on the chromosome, and the evolution operation includes genetic reproduction or genetic crossover.

According to a seventh aspect, an embodiment of the present disclosure provides a system control method, applied to any one of the first aspect to the ninth possible implementation manner of the first aspect, where the method includes:

receiving, by a control decision ensemble module, an ensemble policy that corresponds one-to-one to the control decision ensemble module;

receiving, by the control decision ensemble module, N calculation outputs sent by N function modules in the control system;

performing an ensemble calculation according to the N calculation outputs and the ensemble policy that corresponds one-to-one to the control decision ensemble module, to obtain an ensemble control output; and sending the ensemble control output, so that a controller in the control system generates a control signal according to the ensemble control output, where the control signal is used for controlling a controlled object in the control system.

According to an eighth aspect, an embodiment of the present disclosure provides a system control method, where the method includes:

receiving an ensemble control output, where the ensemble control output is obtained by assigning weights to H algorithms according to H ensemble calculation weighting coefficients and performing a weighted ensemble calculation according to the H ensemble calculation weighting coefficients, the H algorithms are used for separately and independently performing calculations to obtain the ensemble control output, and H is a positive integer greater than or equal to 2;

generating a control signal according to the ensemble control output; and performing system control by using the control signal.

With reference to the eighth aspect, in a first possible implementation manner of the eighth aspect, the method further includes:

collecting a control effect that is obtained according to control of the control signal, where the control effect is measured according to a deviation between an expected control result and an actual control result of a control system;

converting the control effect into fitness of the chromosome, where the fitness is used for indicating a probability that an evolution operation is performed on the chromosome, and the evolution operation includes genetic reproduction or genetic crossover; and sending the fitness.

According to a ninth aspect, an embodiment of the present disclosure provides a system control method, applied to any one of the first aspect to the ninth possible implementation manner of the first aspect, where the method includes:

receiving an ensemble control output sent by a control decision ensemble module;

generating a control signal according to the ensemble control output; and controlling a controlled object in the control system by using the control signal.

According to a tenth aspect, an embodiment of the present disclosure provides a control apparatus, where the control apparatus includes a genetic evolution module, and the genetic evolution module is configured to:

randomly select a chromosome from an evolution pool according to a received control task;

decode the chromosome to obtain (N+1) ensemble policies, where the chromosome includes (N+1) gene fragments, each gene fragment uniquely corresponds to an ensemble policy, each ensemble policy uniquely corresponds to a preset function, one ensemble policy is used for assigning a weight to a preset function that uniquely corresponds to the ensemble policy, the evolution pool maintains two or more chromosomes, and N is a positive integer greater than or equal to 1; and send the (N+1) ensemble policies.

With reference to the tenth aspect, in a first possible implementation manner of the tenth aspect, that each gene fragment uniquely corresponds to an ensemble policy, each ensemble policy uniquely corresponds to a preset function, and one ensemble policy is used for assigning a weight to a preset function that uniquely corresponds to the ensemble policy includes:

objects with weights assigned are $M_n$ algorithms, where the $M_n$ algorithms are used for separately and independently implementing the preset function that uniquely corresponds to the ensemble policy; and each ensemble policy includes $M_n$ ensemble calculation weighting coefficients, where the $M_n$ ensemble calculation weighting coefficients are used for respectively assigning the weights to the $M_n$ algorithms, $M_n$ is a positive integer greater than or equal to 2, $1 \leq n \leq N$, and n is used for indicating serial numbers of different ensemble policies.

With reference to the tenth aspect or the first possible implementation manner of the tenth aspect, in a second possible implementation manner of the tenth aspect, the genetic evolution module is further configured to:

receive fitness, where the fitness is obtained by converting a control effect, the control effect is measured according to a deviation between an expected control result and an actual control result of a control system, the fitness is used for indicating a probability that an evolution operation is performed on the chromosome, and the evolution operation includes genetic reproduction or genetic crossover.

According to an eleventh aspect, an embodiment of the present disclosure provides a system control apparatus, where the apparatus includes a control decision ensemble module, and the control decision ensemble module is configured to:

receive an ensemble policy, where the ensemble policy includes H ensemble calculation weighting coefficients, and H is a positive integer greater than or equal to 2;

receive N calculation outputs, where the N calculation outputs are N calculation result outputs that respectively correspond one-to-one to N preset functions;

perform an ensemble calculation according to the N calculation outputs and the ensemble policy, to obtain an ensemble control output; and send the ensemble control output, where the ensemble control output is used for generating a control signal, and the control signal is used for performing system control.

With reference to the eleventh aspect, in a first possible implementation manner of the eleventh aspect, the control decision ensemble module is configured to:

separately assign weights to H algorithms according to the H ensemble calculation weighting coefficients, where the H algorithms are used for separately and independently performing calculations to obtain the ensemble control output;

perform calculations on the N calculation outputs respectively according to the H algorithms, to obtain H control outputs; and perform a weighted ensemble calculation on the H control outputs according to the H ensemble calculation weighting coefficients included in the ensemble policy, to obtain the ensemble control output.

With reference to the eleventh aspect or the first possible implementation manner of the eleventh aspect, in a second possible implementation manner of the eleventh aspect, the control decision ensemble module is further configured to:

feed back a control effect that is obtained according to control of the control signal, where the control effect is measured according to a deviation between an expected control result and an actual control result of the control system, the control effect is used for being converted into fitness of the chromosome, the fitness is used for indicating a probability that an evolution operation is performed on the chromosome, and the evolution operation includes genetic reproduction or genetic crossover.

According to a twelfth aspect, an embodiment of the present disclosure provides a controller, where the controller is configured to:

receive an ensemble control output, where the ensemble control output is obtained by assigning weights to H algorithms according to H ensemble calculation weighting coefficients and performing a weighted ensemble calculation according to the H ensemble calculation weighting coefficients, the H algorithms are used for separately and independently performing calculations to obtain the ensemble control output, and H is a positive integer greater than or equal to 2;

generate a control signal according to the ensemble control output; and perform system control by using the control signal.

With reference to the twelfth aspect, in a first possible implementation manner of the twelfth aspect, the controller is further configured to:

collect a control effect that is obtained according to control of the control signal, where the control effect is measured according to a deviation between an expected control result and an actual control result of a control system;

convert the control effect into fitness of the chromosome, where the fitness is used for indicating a probability that an evolution operation is performed on the chromosome, and the evolution operation includes genetic reproduction or genetic crossover; and send the fitness.

According to a thirteenth aspect, an embodiment of the present disclosure provides a multi-controller coordination control system, including controllers in R control systems according to any one of the first aspect to the ninth possible implementation manner of the first aspect, where the multi-controller coordination control system further includes:

a coordination control module, configured to: receive elite chromosomes of the R control systems, to obtain R elite chromosomes, where the elite chromosome includes a chromosome, with highest fitness, maintained in an evolution pool of each of the R control systems; sort the R elite chromosomes according to similarities of the R elite chromosomes, to obtain an elite chromosome sorted linked list; and enable a fault tolerance policy when the coordination control module does not receive an elite chromosome of any one of the R control systems within a first preset period, where the fault tolerance policy includes: performing, according to the elite chromosome sorted linked list, fault tolerance processing on the control system whose elite chromosome is not received within the first preset period, where R is a positive integer greater than or equal to 2.

With reference to the thirteenth aspect, in a first possible implementation manner of the thirteenth aspect, after the coordination control module does not receive an elite chromosome of any one of the R control systems within the first preset period, the following is further included:

sending, by the coordination control module, a warning to the control system whose elite chromosome is not received within the first preset period, and if the elite chromosome of the control system is still not received within a second preset period starting from a moment at which the warning is sent, enabling the fault tolerance policy.

With reference to the thirteenth aspect or the first possible implementation manner of the thirteenth aspect, in a second possible implementation manner of the thirteenth aspect, before the enabling a fault tolerance policy, the coordination control module is further configured to:

determine that a controller in the control system whose elite chromosome is not received within the first preset period or the second preset period encounters a fault; and determine a cause for the fault of the controller, where the cause for the fault of the controller includes a software error or a hardware error.

With reference to the second possible implementation manner of the thirteenth aspect, in a third possible implementation manner of the thirteenth aspect, if the cause for the fault of the controller is a software error, the enabling, by the coordination control module, the fault tolerance policy specifically includes:

obtaining, according to the elite chromosome sorted linked list, an elite chromosome that uniquely corresponds to the faulty controller, and sending the elite chromosome that uniquely corresponds to the faulty controller to the faulty controller, so as to respond to a system operation of the faulty controller.

With reference to the second possible implementation manner of the thirteenth aspect, in a fourth possible implementation manner of the thirteenth aspect, if the cause for the fault of the controller is a hardware error, the enabling, by the coordination control module, the fault tolerance policy specifically includes:

searching for K nearest neighbors according to the elite chromosome sorted linked list, to obtain K controllers that have a control policy similar to a control policy of the faulty controller; and enabling the K controllers that have the control policy similar to the control policy of the faulty controller to take over a task of the faulty controller.

According to the control system provided in the embodiments of the present disclosure, an evolution pool maintains two or more chromosomes, when a control task is received, a chromosome is randomly selected from the evolution pool and is decoded to obtain (N+1) ensemble policies, an ensemble calculation is performed on algorithms in N function modules according to ensemble policies that correspond one-to-one to the N function modules, to obtain N calculation outputs, further, an ensemble calculation is performed according to the N calculation outputs and an ensemble policy that corresponds one-to-one to a control decision ensemble module, to obtain an ensemble control output, and a control signal is generated according to the ensemble control output, to perform a control operation on a controlled object. The embodiments of the present disclosure proposes, by using a theory of genetic evolution, that an evolution pool maintains multiple chromosomes, different chromosomes may be decoded to obtain different ensemble policies, and a control signal is obtained according to an ensemble policy to complete a control task, so that a complete and dynamic control system is provided for a complex control environment in reality, to improve adaptability of the control system, thereby improving control efficiency.

BRIEF DESCRIPTION OF DRAWINGS

To describe the technical solutions in the embodiments of the present disclosure more clearly, the following briefly introduces the accompanying drawings required for describing the embodiments of the present disclosure or the prior art. Apparently, the accompanying drawings in the following description show merely some embodiments of the present disclosure, and a person of ordinary skill in the art may still derive other drawings from these accompanying drawings without creative efforts.

DESCRIPTION OF EMBODIMENTS

The following clearly describes the technical solutions in the embodiments of the present disclosure with reference to the accompanying drawings in the embodiments of the present disclosure.

Figure 1:
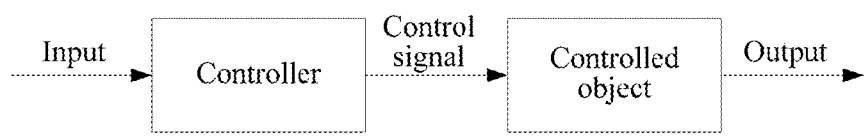
FIG. 1 is a schematic diagram of an open-loop control system in the prior art.
Figure 2:
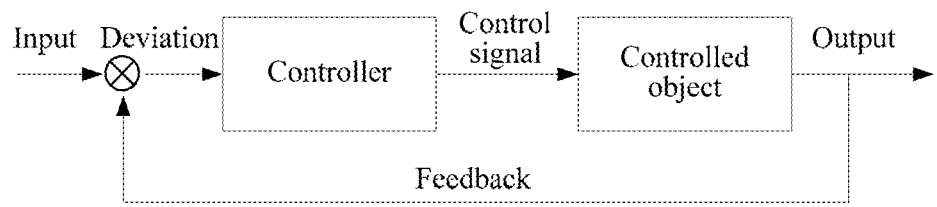
FIG. 2 is a schematic diagram of a closed-loop control system in the prior art.
Figure 3:
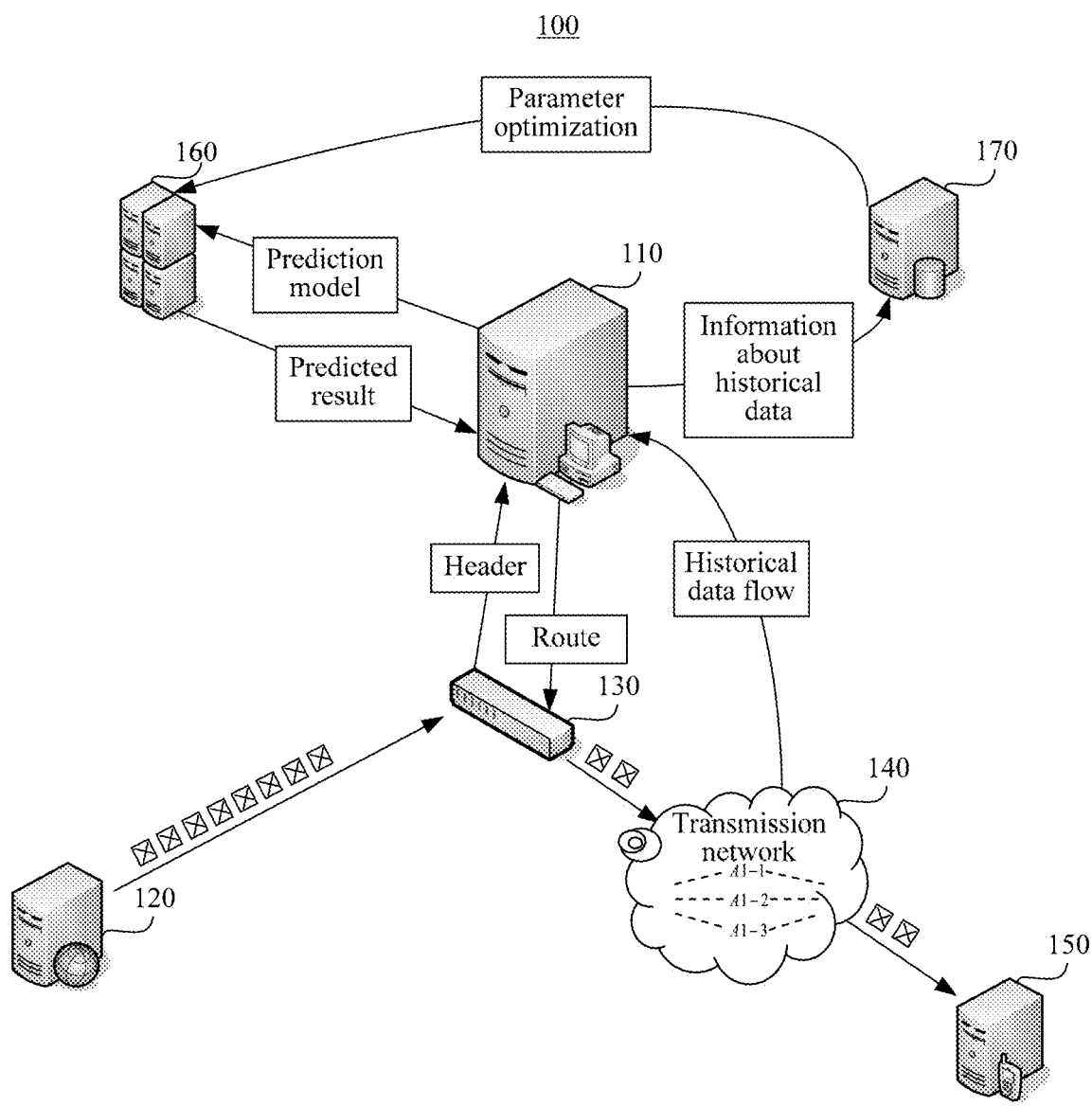
FIG. 3 is a diagram of a network architecture of a system control method according to an embodiment of the present disclosure.

When a system control method provided in the present disclosure is applied to network control, the system control method provided in the present disclosure may be deployed and implemented in a data transmission network 100 shown in FIG. 3. The data transmission network 100 includes a central control server 110, a source server 120, a network switch 130, a transmission network 140, a client device 150, a prediction server 160, and a training server 170.

The central control server 110 is a core processing device of the transmission network 100, is separately interconnected to the network switch 130, the transmission network 140, the client device 150, the prediction server 160, and the training server 170, and is configured to perform an information exchange, instruction transfer, and network data transmission with the network switch 130, the transmission network 140, the training server 170 and the prediction server 160. In addition, the source server 120, the network switch 130, the transmission network 140, the client device 150, the training server 170, and the prediction server 160 may be connected to each other and exchange information and instructions according to different service requirements and functional requirements. Functions and composition of the devices are described in detail below.

The central control server 110 mainly includes main components such as a processor, a memory, and a data interface. The processor completes a corresponding processing function mainly by invoking a processing program stored in a storage device. The data interface is mainly responsible for data receiving/transmitting between devices inside the central control server 110 and between the central control server 110 and an external component. The processor may be a general purpose processor, a digital signal processor (Digital Signal Processor, DSP), an application specific integrated circuit (Application Specific Integrated Circuit, ASIC), a field programmable gate array (Field Programmable Gate Array, FPGA) or another programmable logic device, a discrete gate or transistor logic device, or a discrete hardware component, and may implement or perform methods, steps and logic block diagrams disclosed in the following embodiments of the present disclosure. The general purpose processor may be a microprocessor or the processor may be any conventional processor or the like. The steps in the methods disclosed with reference to the embodiments of the present disclosure may be directly embodied to be implemented by means of execution of a hardware decoding processor, or implemented by means of execution of a combination of hardware in a decoding processor and a software module. The software module may be located in a storage medium that is mature in the art such as a random access memory (Random Access Memory, RAM), a flash memory, a read-only memory (Read-Only Memory, ROM), a programmable read-only memory or an electrically erasable programmable memory, or a register.

The central control server 110 receives, by using the data interface, a route request reported by the network switch 130, where the route request includes to-be-routed information about a current data flow, and sends the information about the current data flow in the route request to the prediction server 160 by using the data interface. The prediction server 160 sends length prediction information of the current data flow to the central control server 110 according to the information about the current data flow, a central processing unit of the central control server 110 invokes the processing program pre-stored in the memory, determines a type of the current data flow according to the length prediction information of the current data flow returned by the prediction server 160, and calculates an optimal transmission path matching the type of the current data flow. Subsequently, the central control server 110 configures a route for the current data flow according to the optimal transmission path, and sends the configured route to the network switch 130. Moreover, the central control server 110 is further configured to: collect, by using the data interface of the central control server 110, information, which is reported by the network switch 130, about a historical data flow on which routing is already completed, and send the information about the historical data flow to the training server 170.

The source server 120 mainly includes main components such as a processor, a memory, and a data interface. The processor is mainly configured to send, by using the data interface, data stored in the memory to the client device 150 by using the network switch 130 and the transmission network 140.

Main tasks of the network switch 130 are to extract a header of a first data packet of a data flow that newly enters the network, that is, a current data flow, report the header to the central control server 110, wait and forward a data packet of the current data flow according to the route calculated and configured by the central control server 110. Moreover, the network switch 130 further collects the information about the historical data flow on which routing is already completed, and reports the information to the central control server 110. The information about the historical data flow includes a pattern vector of the historical data flow and a corresponding data length.

The transmission network 140 includes a transmission cable and multiple network nodes, and is mainly configured to transmit data according to an instruction of the network switch 130.

The client device 150 includes main components such as a processor, a memory, and a data interface. The processor is mainly configured to send a data request of a client to the source server 120 by using the data interface and the network switch 130, and store, in the memory, data content that is sent by the source server 120 by using the network switch 130 and the transmission network 140.

The prediction server 160 may be an independent processing device, and includes, for example, a processor, a memory, and a data interface that are independent. The processor is mainly configured to invoke a processing program stored in the memory to process the information about the current data flow that is received by using the data interface, so as to predict a length of the current data flow, and send information about the predicted length to the central control server 110 by using the data interface. The information about the current data flow is from the central control server 110. Moreover, the prediction server 160 may be also a working unit attached to the central control server 110, that is, the prediction server 160 and the central control server 110 share a same memory and a same data interface, but use different processors. In this case, data transmission between the prediction server 160 and the central control server 110 is completed mainly by using a data bus inside the central control server 110. Moreover, the prediction server 160 may also share a same processor with the central control server 110, and a manner of the sharing may be to perform synchronous (parallel processing) or asynchronous (time-division processing) data processing by using different processing resources in the processor, or to perform asynchronous (time-division processing) processing by using a same processing resource in the processor. Moreover, the prediction server 160 may be also implemented by using a virtual machine, that is, the central control server 110 simulates, by using the processor, the memory, and the data interface of the central control server 110 and by invoking a program stored in the memory, a complete computer system that has a complete hardware system function and runs in a completely isolated environment. The computer system may independently complete all work that the prediction server 160 needs to complete without affecting running of the central control server 110. It may be understood that the prediction server 160 may be further simplified into a software program stored in the memory of the central control server 110. The software program is invoked by the central control server 110 at an appropriate time, so as to implement a data length prediction function.

The training server 170 may be an independent processing device and includes main components such as a processor, a memory, and a data interface. The processor is mainly configured to invoke a training program stored in the memory to process information about a historical data flow to obtain an optimized data length prediction parameter, and send the optimized data length prediction parameter to the prediction server 160. The prediction server 160 performs data length prediction according to the optimized data length prediction parameter. Moreover, the training server 170 further updates the data length prediction parameter according to the newly obtained information about the historical data, thereby ensuring that the prediction server 160 can adjust a predicted result in real time according to a change situation of a network data flow. The training server 170, similar to the prediction server 160, may be also a working unit attached to the central control server 110, that is, the training server 170 and the central control server 110 share a same memory and a same data interface, but use different processors. In this case, data transmission between the training server 170 and the central control server 110 is completed mainly by using the data bus inside the central control server 110. Moreover, the training server 170 may also share a same processor with the central control server 110, and a manner of the sharing may be to perform synchronous (parallel processing) or asynchronous (time-division processing) data processing by using different processing resources in the processor, or to perform asynchronous (time-division processing) data processing by using a same processing resource in the processor. Moreover, the training server 170 may be also implemented by using a virtual machine, that is, the central control server 110 simulates, by using the processor, the memory, and the data interface of the central control server 110 and by invoking a program stored in the memory, a complete computer system that has a complete hardware system function and runs in a completely isolated environment. The computer system may independently complete all work that the training server 170 needs to complete. It can be understood that, the training server 170 may be further simplified into a software program stored in the memory of the central control server 110. The software program is invoked by the central control server 110 at an appropriate time, so as to optimize the foregoing data length prediction parameter and update the foregoing data length prediction parameter in real time.

The foregoing describes a hardware environment in which detection on a type of a network data flow of the present disclosure is implemented. However, it should be noted that, the foregoing hardware environment is not a unique manner in which the present disclosure is performed, and may be dynamically adjusted according to hardware resources, and service requirements, that is, data transmission requirements. For example, the central control server 110, the network switch 130, the prediction server 160, and the training server 170 are centralized in a data control center, so as to improve processing efficiency.

That is, the method of the present disclosure may be deployed and implemented based on the foregoing application environment. The following describes, with reference to the accompanying drawings, a control system, a system control method, a system control apparatus, and a controller that are provided in the present disclosure.

Figure 4:
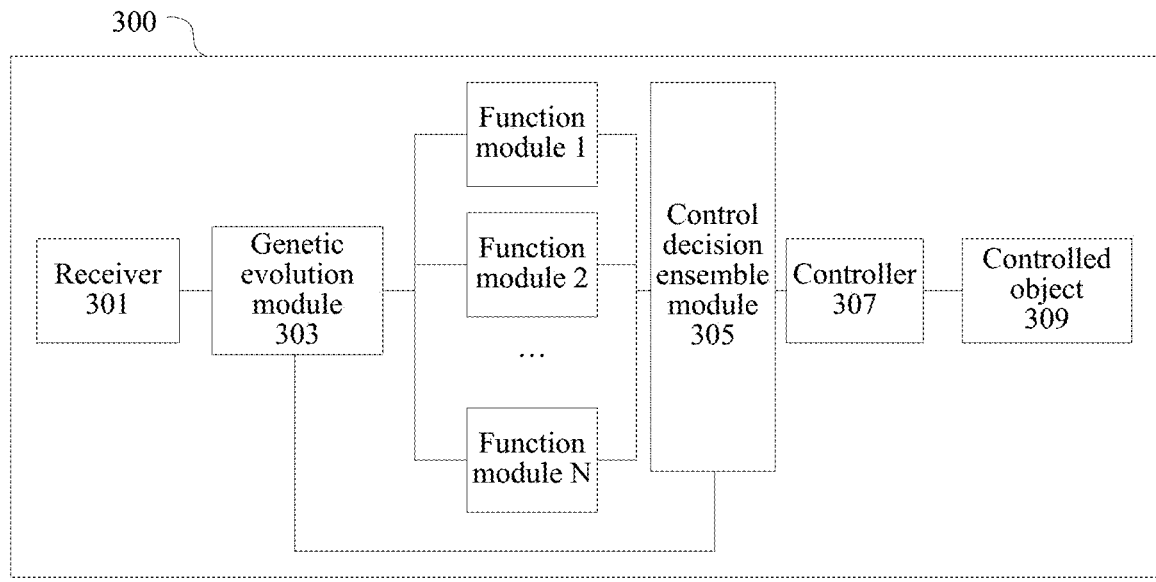
FIG. 4 is a structural block diagram of a control system according to an embodiment of the present disclosure.

Embodiment 1: FIG. 4 is a structural block diagram of a control system 300 according to an embodiment of the present disclosure. The control system 300 shown in FIG. 4 may be disposed in a physical application environment shown in FIG. 3 for implementation.

The control system 300 includes a receiver 301, a genetic evolution module 303, a control decision ensemble module 305, N function modules, a controller 307, and a controlled object 309.

The receiver 301 is configured to receive a control task.

The genetic evolution module 303 is configured to: randomly select a chromosome from an evolution pool according to the control task, and decode the chromosome to obtain (N+1) ensemble policies, where the chromosome includes (N+1) gene fragments, the (N+1) gene fragments respectively include ensemble policies that correspond one-to-one to the control decision ensemble module and the N function modules, the evolution pool maintains two or more chromosomes, and N is a positive integer greater than or equal to 1.

The N function modules are configured to perform an ensemble calculation respectively according to ensemble policies that correspond one-to-one to the N function modules, to obtain N calculation outputs.

The control decision ensemble module 305 is configured to perform an ensemble calculation according to the N calculation outputs and an ensemble policy that corresponds one-to-one to the control decision ensemble module, to obtain an ensemble control output.

The controller 307 is configured to: generate a control signal according to the ensemble control output, and control the controlled object 309 by using the control signal.

According to the control system 300 provided in this embodiment of the present disclosure, an evolution pool maintains two or more chromosomes, when a control task is received, a chromosome is randomly selected from the evolution pool and is decoded to obtain (N+1) ensemble policies, an ensemble calculation is performed on algorithms in N function modules according to ensemble policies that correspond one-to-one to the N function modules, to obtain N calculation outputs, further, an ensemble calculation is performed according to the N calculation outputs and an ensemble policy that corresponds one-to-one to a control decision ensemble module, to obtain an ensemble control output, and a control signal is generated according to the ensemble control output, to perform a control operation on a controlled object. This embodiment of the present disclosure proposes, by using a theory of genetic evolution, that an evolution pool maintains multiple chromosomes, different chromosomes may be decoded to obtain different ensemble policies, and a control signal is obtained according to an ensemble policy to complete a control task, so that a complete and dynamic control system is provided for a complex control environment in reality.

Based on Embodiment 1, optionally, in this embodiment of the present disclosure, the $n^{th}$ function module of the N function modules includes $M_n$ algorithms, where $M_n$ is a positive integer greater than or equal to 2, $1 \le n \le N$, the $M_n$ algorithms are used for separately and independently implementing a specific function of the function module, and the $n^{th}$ function module is any one of the N function modules; and correspondingly, that the N function modules are configured to perform an ensemble calculation respectively according to ensemble policies that correspond one-to-one to the N function modules, to obtain N calculation outputs includes:

the $n^{th}$ function module is configured to perform an ensemble calculation on the $M_n$ algorithms according to an ensemble policy that corresponds one-to-one to the $n^{th}$ function module, to obtain one calculation output.

For example, when this embodiment provided in the present disclosure is applied to SDN control, an SDN control system may be divided into a new-data-flow length prediction module, a network state estimation and prediction module, and the like according to functions. These multiple modules obtained through division for implementing a function of the SDN control system are the N function modules in this embodiment of the present disclosure. Usually, a function of a particular function module is implemented by means of a calculation of an algorithm or a model in the function module. In the prior art, an algorithm or a model is usually used to implement a function of a function module. However, a controlled object in reality is very complex. Any mathematical model has a model hypothesis and model simplification to some extent, and cannot fully accurately describe a complex physical system. Therefore, in this embodiment of the present disclosure, $M_n$ algorithms are set for each function module, and the algorithm herein may also be a calculation model. Because essence of both the calculation model and the algorithm is to implement the function module, the calculation model and the algorithm are collectively referred to as an algorithm in this embodiment of the present disclosure, and details are not described. The $M_n$ algorithms are separately and independently used for performing calculations, so as to implement the function of the function module. Therefore, a disadvantage that a single algorithm cannot accurately describe a function module in a complex physical system is avoided. That is, when an algorithm is inaccurate, another algorithm can be used to back up the algorithm, and an ensemble calculation is performed on the $M_n$ algorithms according to an ensemble policy that corresponds one-to-one to the function module, to obtain a calculation output of the function module. It should be noted that "any one" in "the $n^{th}$ function module is any one of the N function modules" described in this embodiment of the present disclosure includes the following two meanings.

1. "Any one" herein indicates each of the N function modules. That is, each of the N function modules includes $M_n$ algorithms. Herein, a subscript n of M is used for indicating serial numbers of different function modules. Because a function module is in a one-to-one correspondence with an ensemble policy of the function module, n is also used for indicating serial numbers of different ensemble policies. In a physical environment in reality, the serial number may be a carried identifier or in any other form that can be used for differentiation. This is not limited herein.

2. "Any one" herein indicates that a solution in which one of the N function modules includes $M_n$ algorithms falls within the protection scope of this embodiment of the present disclosure. For example, one of five function modules includes $M_n$ algorithms, and the other four function modules each include only one algorithm. Alternatively, two, or three, or four of five function modules each include $M_n$ algorithms, while the remaining three, or two, or one function modules each includes only one algorithm. Compared with the first solution, an effect of the second solution may not be optimal, but the second solution is disclosed by a protection solution provided in this embodiment of the present disclosure, and falls within the protection scope of this embodiment of the present disclosure.

Based on the foregoing embodiment, specifically, the $n^{th}$ ensemble policy of the (N+1) ensemble policies that corresponds one-to-one to the $n^{th}$ function module includes $M_n$ ensemble calculation weighting coefficients, and the $M_n$ ensemble calculation weighting coefficients are used for respectively assigning weights to the $M_n$ algorithms included in the $n^{th}$ function module.

The $n^{th}$ function module of the N function modules is configured to: perform calculations respectively according to the $M_n$ algorithms included in the $n^{th}$ function module, to obtain $M_n$ calculation results, and perform a weighted ensemble calculation on the $M_n$ calculation results according to the $M_n$ ensemble calculation weighting coefficients included in the $n^{th}$ ensemble policy, to obtain one calculation output.

Figure 5:
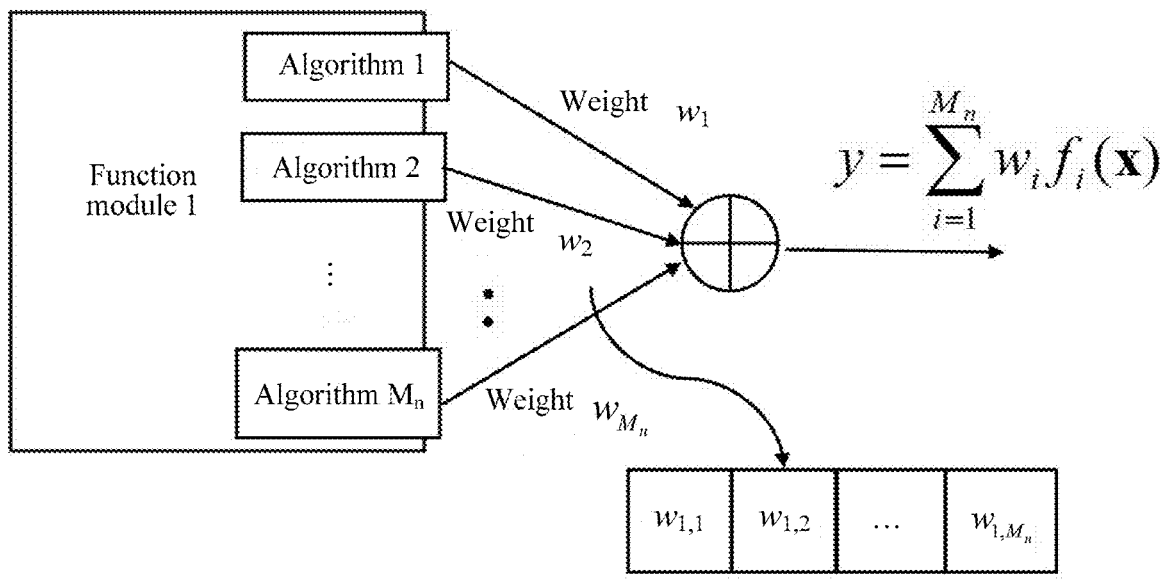
FIG. 5 is a schematic diagram of a logical process of weight assignment in a control system according to an embodiment of the present disclosure.
Figure 6:
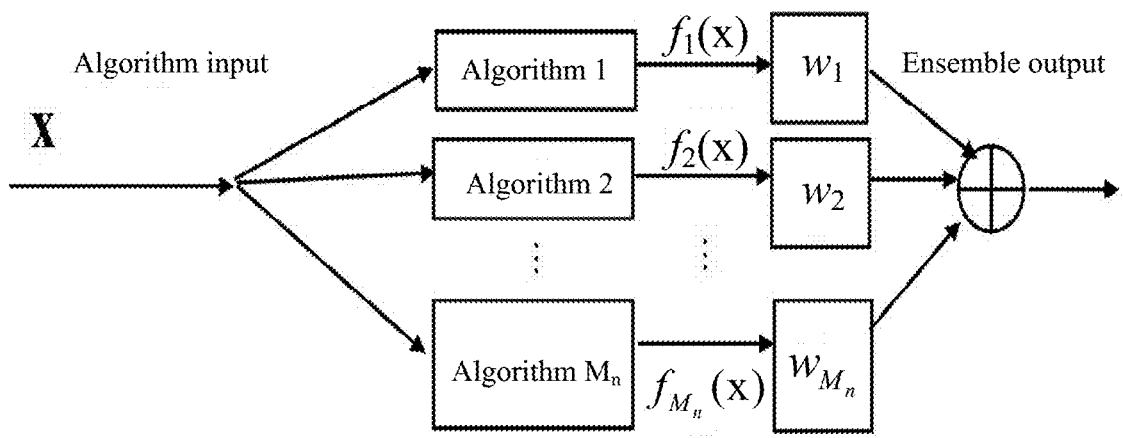
FIG. 6 is a schematic diagram of a logical process of an ensemble calculation in a control system according to an embodiment of the present disclosure.

For example, as shown in FIG. 5, it is assumed that the function module in the box on the left is the first function module of the N function modules. The function module includes $M_n$ algorithms, and each algorithm corresponds to one ensemble calculation weighting coefficient. Weights are $w_1, w_2, \ldots,$ and $w_{M_n}$ shown in the figure. A subscript 1 in $w_{1,M_q}$ in a gene fragment in the bottom right corner indicates a serial number of a function module corresponding to the gene fragment. Referring to FIG. 5 and FIG. 6, weights are assigned to calculation results of the algorithms in the function module by using these ensemble calculation weighting coefficients, so as to perform an ensemble calculation according to a formula $$y = \sum_{i=1}^{M_n} w_i f_i(x),$$

to obtain a final output y. It should be noted that the calculation formula herein is only an example, and does not limit this embodiment of the present disclosure. It should be noted that different values of n correspond to different values of $M_n$. For example, a function module 1 has $M_1$ algorithms, and a corresponding ensemble policy includes $M_1$ ensemble calculation weighting coefficients; a function module 2 has $M_2$ algorithms, and a corresponding ensemble policy includes $M_2$ ensemble calculation weighting coefficients; the rest may be deduced by analogy, and details are not described. As shown in FIG. 4, $w_{0,1}$ to $w_{0,n}$ in the bottom right corner are used for indicating a gene fragment that corresponds to the function module. This gene fragment includes an ensemble policy of the function module, and the ensemble policy includes $M_n$ ensemble calculation weighting coefficients.

Figure 7:
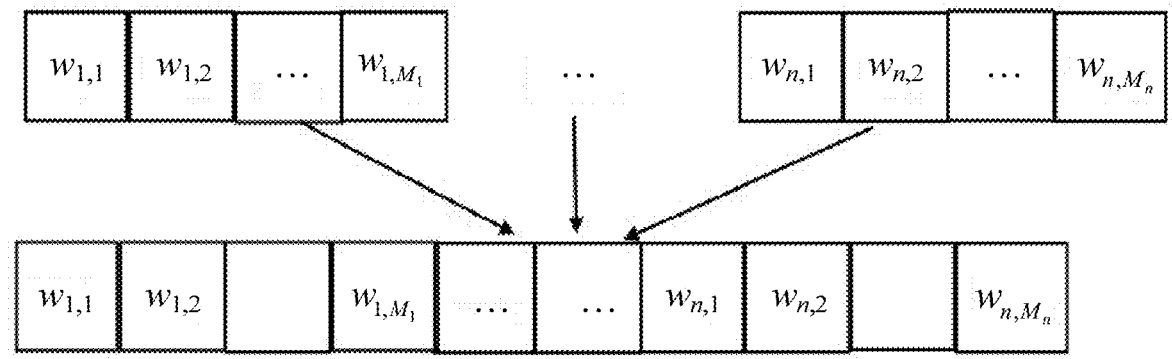
FIG. 7 is a schematic diagram of a construction relationship between a gene fragment and a chromosome in a control system according to an embodiment of the present disclosure.

As shown in FIG. 7, one chromosome includes (N+1) gene fragments, where N gene fragments are in a one-to-one correspondence with N function modules, and one remaining gene fragment corresponds to the control decision ensemble module 305. A row at the bottom of the figure is used for indicating the chromosome, and different short rows at the top are used for indicating different gene fragments, that is, multiple gene fragments form a structure of one chromosome.

Figure 8:
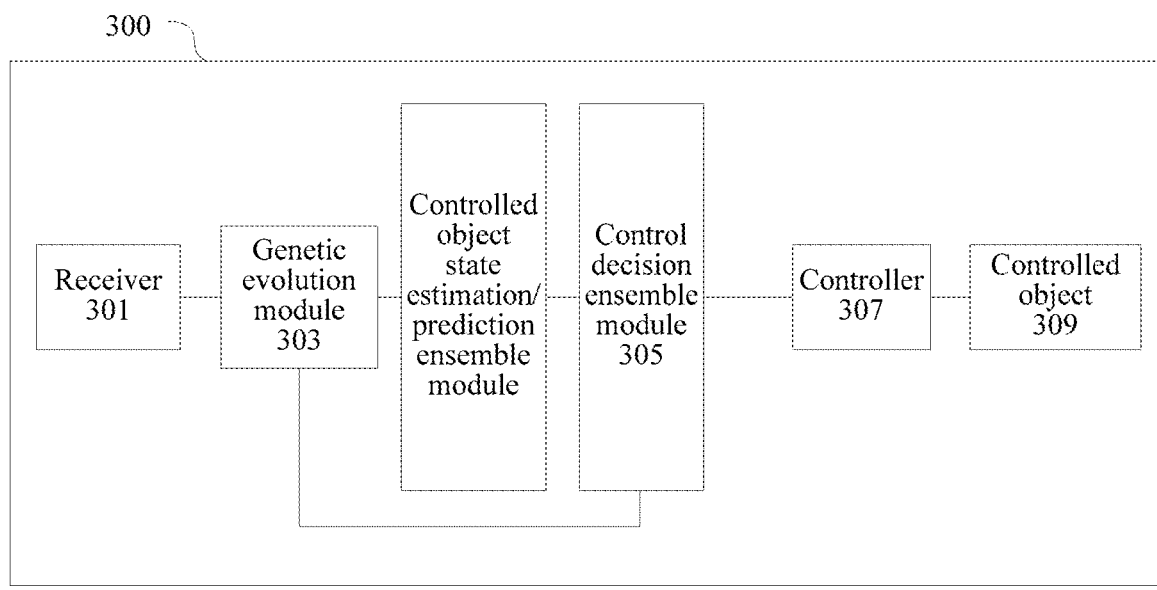
FIG. 8 is another structural block diagram of a control system according to an embodiment of the present disclosure.

Based on the foregoing embodiment, optionally, as shown in FIG. 8, if N=1, and n=1, the N function modules are a controlled object state estimation/prediction ensemble module; and the controlled object state estimation/prediction ensemble module includes $M_1$ first algorithms, where the $M_1$ first algorithms are used for separately and independently implementing a function of estimating/predicting a state of the controlled object.

Figure 9:
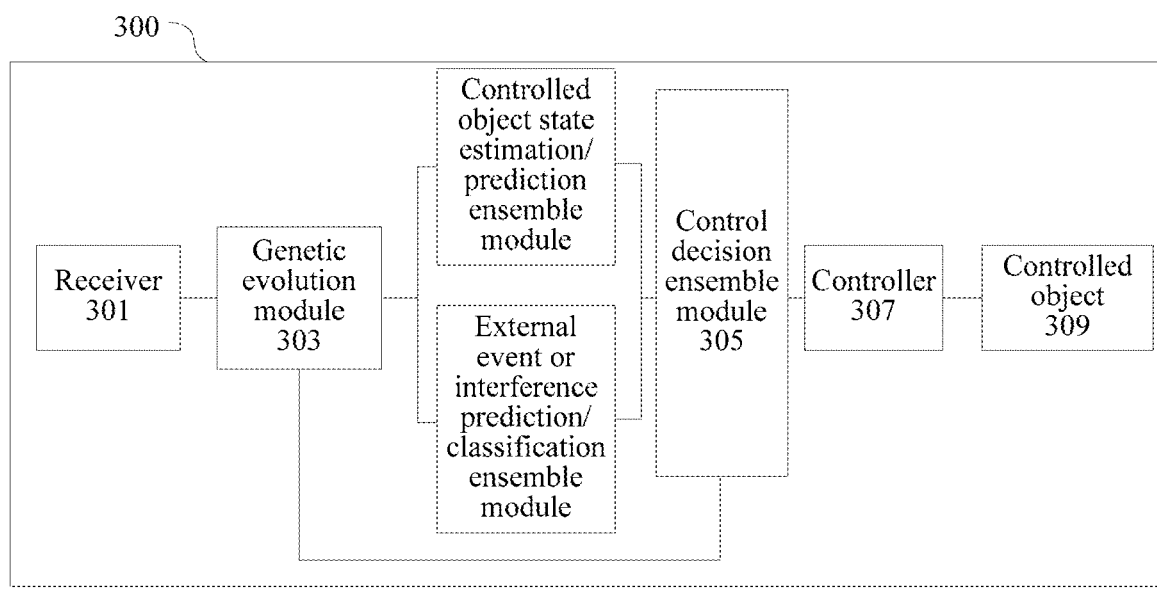
FIG. 9 is still another structural block diagram of a control system according to an embodiment of the present disclosure.

Optionally, as shown in FIG. 9, if N=2, and n=1 or 2, the N function modules are respectively a controlled object state estimation/prediction ensemble module and an external event or interference prediction/classification ensemble module; the controlled object state estimation/prediction ensemble module includes $M_1$ first algorithms, where the $M_1$ first algorithms are used for separately and independently implementing a function of estimating/predicting a state of the controlled object; and the external event or interference prediction/classification ensemble module includes $M_2$ second algorithms, where the $M_2$ second algorithms are used for separately and independently implementing a function of predicting or classifying an external event or interference.

Based on all the foregoing embodiments, in this embodiment of the present disclosure, the control decision ensemble module includes H algorithms, the H algorithms are used for separately and independently implementing a function of the control decision ensemble module, and H is a positive integer greater than or equal to 2.

The ensemble policy of the (N+1) ensemble policies that corresponds one-to-one to the control decision ensemble module includes H ensemble calculation weighting coefficients, and the H ensemble calculation weighting coefficients are used for respectively assigning weights to the H algorithms included in the control decision ensemble module.

The control decision ensemble module is configured to: perform calculations on the N calculation outputs respectively according to the H algorithms included in the control decision ensemble module, to obtain H control outputs; and perform a weighted ensemble calculation on the H control outputs according to the H ensemble calculation weighting coefficients included in the ensemble policy that corresponds one-to-one to the control decision ensemble module, to obtain the ensemble control output.

For ease of understanding, for example, when the embodiment provided in the present disclosure is applied to SDN control, the control decision ensemble module may be specifically a routing decision module. The routing decision module may implement a routing decision function of the routing decision module by using H different algorithms to respectively perform calculations according to the N calculation outputs outputted by the N function modules, so as to avoid that a single algorithm cannot accurately describe the routing decision module. Correspondingly, the ensemble policy that corresponds one-to-one to the routing decision module includes H ensemble calculation weighting coefficients, which are used for assigning weights to H control outputs that are obtained by separately and independently performing calculations on the H different algorithms according to the N calculation outputs outputted by the N function modules, so as to further perform a weighted ensemble calculation according to the control outputs and the weights assigned to the control outputs, to obtain a routing decision result. The routing decision result is the ensemble control output described in this embodiment of the present disclosure.

Based on Embodiment 1 and all the foregoing optional embodiments, in this embodiment of the present disclosure, the controller is further configured to: when the control task ends, collect a control effect that is obtained according to control of the control signal, where the control effect is measured according to a deviation between an expected control result and an actual control result of the control system; convert the control effect into fitness of the chromosome, where the fitness is used for indicating a probability that an evolution operation is performed on the chromosome; and send the fitness to the genetic evolution module, so that the genetic evolution module performs an evolution operation on the chromosome according to the fitness, where the evolution operation includes genetic reproduction or genetic crossover.

Figure 10:
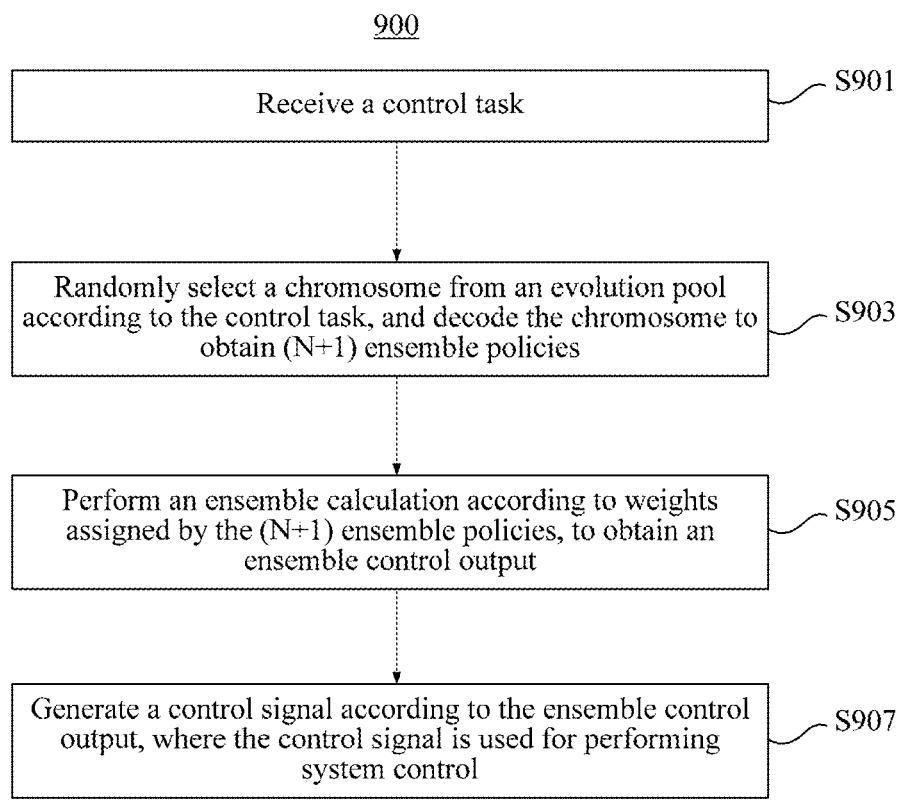
FIG. 10 is a schematic flowchart of a system control method according to an embodiment of the present disclosure.

Embodiment 2: As shown in FIG. 10, FIG. 10 is a schematic flowchart of a system control method 900 according to an embodiment of the present disclosure.

S901. Receive a control task.

S903. Randomly select a chromosome from an evolution pool according to the control task, and decode the chromosome to obtain (N+1) ensemble policies.

The chromosome includes (N+1) gene fragments, each gene fragment uniquely corresponds to an ensemble policy, each ensemble policy uniquely corresponds to a preset function, one ensemble policy is used for assigning a weight to a preset function that uniquely corresponds to the ensemble policy, the evolution pool maintains two or more chromosomes, and N is a positive integer greater than or equal to 1.

S905. Perform an ensemble calculation according to weights assigned by the (N+1) ensemble policies, to obtain an ensemble control output.

S907. Generate a control signal according to the ensemble control output, where the control signal is used for performing system control.

According to the system control method 900 provided in this embodiment of the present disclosure, a chromosome is randomly selected from an evolution pool according to the control task, the chromosome is decoded to obtain (N+1) ensemble policies, an ensemble calculation is performed according to weights assigned by the (N+1) ensemble policies, to obtain an ensemble control output, and further a control signal is generated according to the ensemble control output, to control a controlled object. This embodiment of the present disclosure proposes, by using a theory of genetic evolution, that an evolution pool maintains multiple chromosomes, different chromosomes may be decoded to obtain different ensemble policies, and a control signal is obtained according to an ensemble policy to complete a control task, so that a complete and dynamic system control method is provided for a complex control environment in reality.

Figure 11:
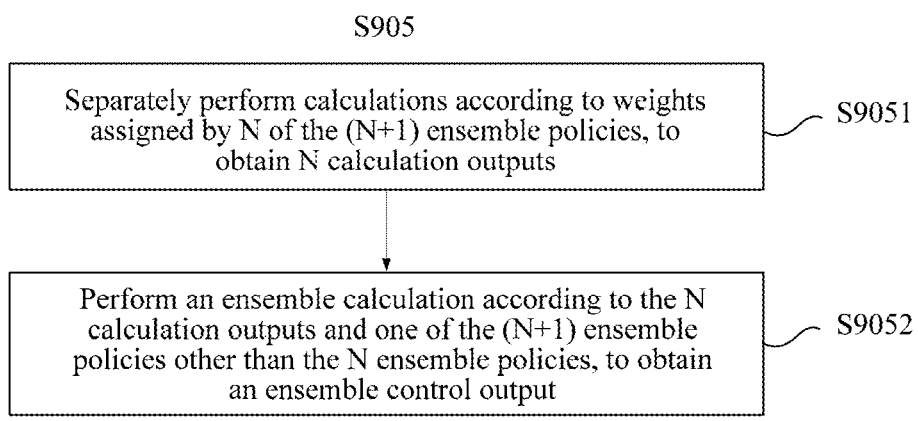
FIG. 11 is a further schematic flowchart of a system control method according to an embodiment of the present disclosure.

Specifically, as shown in FIG. 11, the performing an ensemble calculation according to weights assigned by the (N+1) ensemble policies, to obtain an ensemble control output of S905 includes:

S9051. Separately perform calculations according to weights assigned by N of the (N+1) ensemble policies, to obtain N calculation outputs.

S9052. Perform an ensemble calculation according to the N calculation outputs and one of the (N+1) ensemble policies other than the N ensemble policies, to obtain the ensemble control output.

Based on Embodiment 2 and specific solutions of Embodiment 2, in this embodiment of the present disclosure, specifically, that each gene fragment uniquely corresponds to an ensemble policy, each ensemble policy uniquely corresponds to a preset function, and one ensemble policy is used for assigning a weight to a preset function that uniquely corresponds to the ensemble policy includes: objects with weights assigned are $M_n$ algorithms, where the $M_n$ algorithms are used for separately and independently implementing the preset function that uniquely corresponds to the ensemble policy; and each ensemble policy includes $M_n$ ensemble calculation weighting coefficients, where the $M_n$ ensemble calculation weighting coefficients are used for respectively assigning the weights to the $M_n$ algorithms, $M_n$ is a positive integer greater than or equal to 2, $1 \leq n \leq N$, and n is used for indicating serial numbers of different ensemble policies.

In this embodiment of the present disclosure, $M_n$ algorithms are used for implementing one preset function, thereby avoiding that a single algorithm cannot accurately implement a preset function in a complex physical system, that is, when an algorithm is inaccurate, another algorithm can be used to back up the algorithm. The weights are assigned to the $M_n$ algorithms according to $M_n$ ensemble calculation weighting coefficients included in one ensemble policy, and further, an ensemble calculation is performed, so as to obtain a calculation output of the function module.

Optionally, the separately performing calculations according to weights assigned by N of the (N+1) ensemble policies, to obtain N calculation outputs includes: performing the following step for the $n^{th}$ ensemble policy of the N ensemble policies: performing a weighted ensemble calculation on the $M_n$ algorithms according to the $M_n$ ensemble calculation weighting coefficients, to obtain one calculation output, where the one calculation output is used for indicating an output of a preset function that uniquely corresponds to the $n^{th}$ ensemble policy, and the $n^{th}$ ensemble policy is any one of the N ensemble policies.

Further, optionally, after the generating a control signal according to the ensemble control output, the method further includes: collecting a control effect that is obtained according to control of the control signal, where the control effect is measured according to a deviation between an expected control result and an actual control result of the control system; and converting the control effect into fitness of the chromosome, where the fitness is used for indicating a probability that an evolution operation is performed on the chromosome, and the evolution operation includes genetic reproduction or genetic crossover.

The method 900 shown in FIG. 10 and FIG. 11 can be implemented in the control system 300 shown in the foregoing embodiment. To avoid repetition, details are not described herein.

Figure 12:
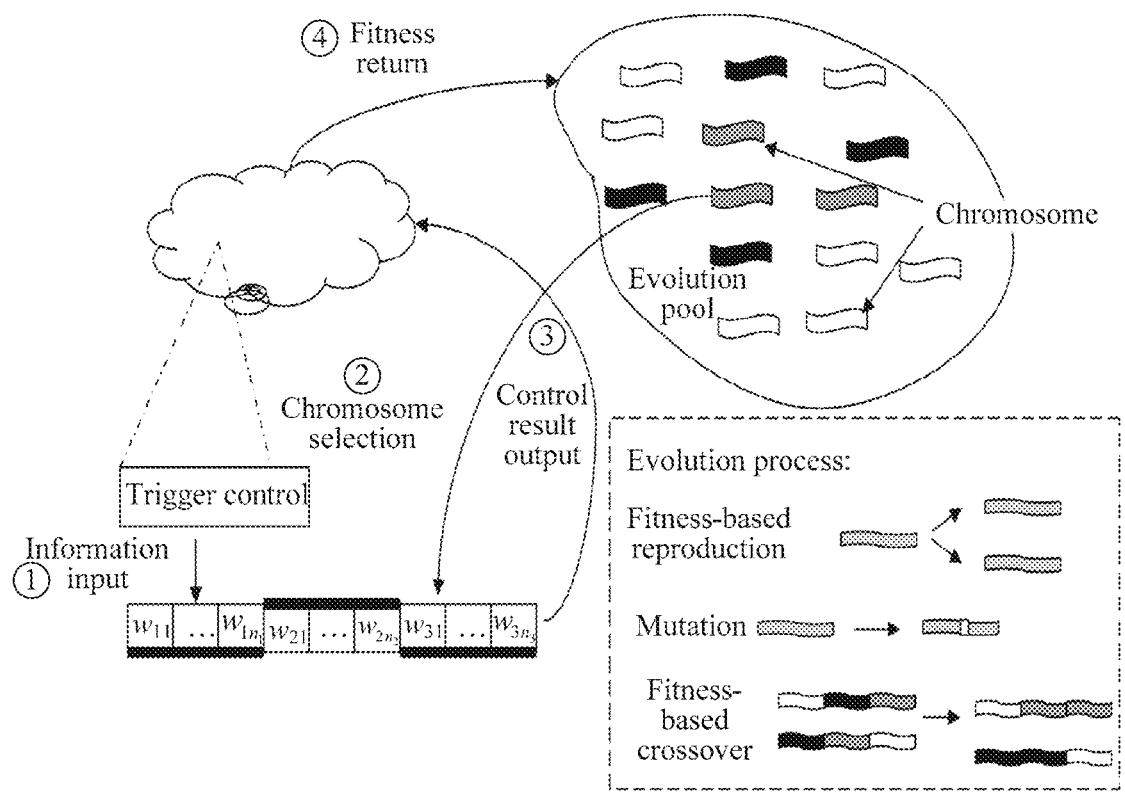
FIG. 12 is a schematic diagram of comprehensive presentation of a system control method according to an embodiment of the present disclosure.

As shown in FIG. 12, comprehensive presentation is provided by using a schematic diagram with reference to Embodiment 1 and all embodiments attached to Embodiment 1, and Embodiment 2 and all embodiments attached to Embodiment 2.

1. Perform trigger control equivalent to the control task described above.

2. Trigger, by using a trigger task, random selection of a chromosome from an evolution pool.

3. Form a control result output, that is, the ensemble control output described above, according to an ensemble policy that is obtained by decoding the chromosome.

4. Perform system control by using a control signal that is generated according to the control result output, convert a control effect into fitness of the chromosome, and return the fitness to the evolution pool.

Next time trigger control is received, the foregoing procedure is still applied, and gradually, each chromosome in the evolution pool has its own newest fitness, and details are not described. After a chromosome has its own newest fitness, a genetic evolution operation may be performed according to a magnitude of the fitness. A specific operation method is described below by using an example.

Before this, genetic evolution needs to be explained first.

A genetic algorithm (Genetic Algorithm) is a computation model for searching for an optimal solution, and was first proposed in 1975 by an American professor J. Holland enlightened by natural selection and genetics of Darwinism. The principle of the genetic algorithm is that starting from a potential solution set for a to-be-resolved problem, a species includes a particular quantity of individuals. Each individual is a chromosome that includes multiple gene fragments. After the first generation of species appears, according to the principle of survival of the fittest, the species evolves to have better individuals. A process of evolution mainly includes selection (selection), reproduction (reproduction), mutation (mutation), and genetic crossover (crossover). By means of the foregoing process, a new species of a solution set for a problem appears. A probability that the foregoing operation occurs is based on fitness (fitness) of the chromosome. Fitness represents superiority, of a solution represented by a chromosome, for a to-be-resolved problem. A solution with higher fitness is closer to an optimal solution. A genetic operation based on a fitness function embodies the principles of survival of the fittest and natural selection in the natural world. Different genetic operations are described in detail below.

Selection (Selection):

According to the principle of natural selection, a stronger individual has a greater probability of survival in an environment. To implement natural selection, a life cycle (life cycle) of each chromosome is initialized.

$T_0(s) = c_f f(s)$, where herein, s indicates a chromosome, $T(s)$ indicates a life cycle of the chromosome, $f(s)$ is fitness of the chromosome, and $c_f > 0$, and is a nonnegative constant for controlling the life cycle.

In the $k^{th}$ generation (generation) in the evolution pool, $T_k(s) = T_{k-1}(s) - 1$, where it indicates that a life cycle of the chromosome is shortened by one generation cycle. When $T_k(s)=0$, the chromosome is removed from a system.

Figure 13:
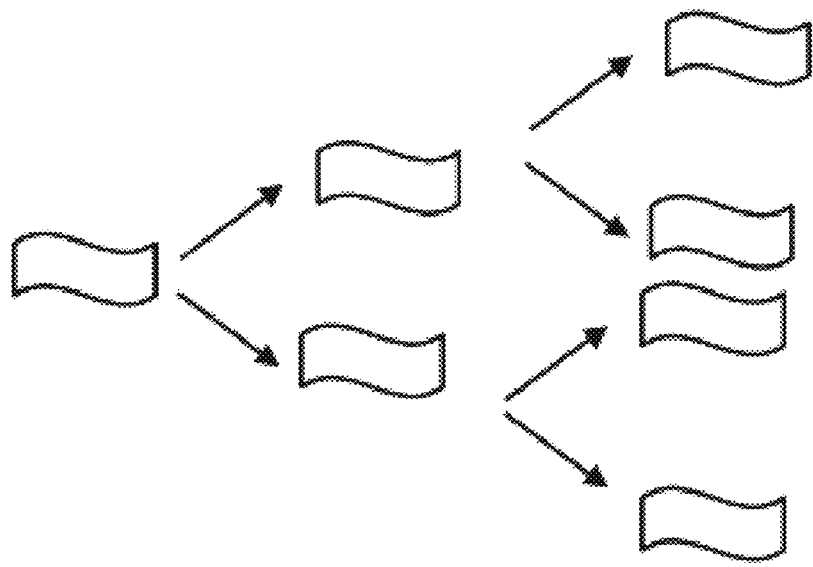
FIG. 13 is a schematic diagram of a genetic reproduction process of genetic evolution in a system control method according to an embodiment of the present disclosure.

Reproduction (Reproduction):

In each generation cycle, there is a particular probability that each chromosome is reproduced. Reproduction is to reproduce a new chromosome individual that is identical with a parent body. According to the principle of survival of the fittest, an individual with higher fitness has a greater probability of reproduction. It is defined that a probability that a chromosome is reproduced is:

$$p_r(s)=c_r f(s), \text{ where}$$

herein, $c_r>0$ and is a nonnegative constant for controlling a reproduction probability. If an individual has higher fitness, the individual accounts for a greater proportion in a species. A process of reproduction is shown in FIG. 13.

Figure 14:
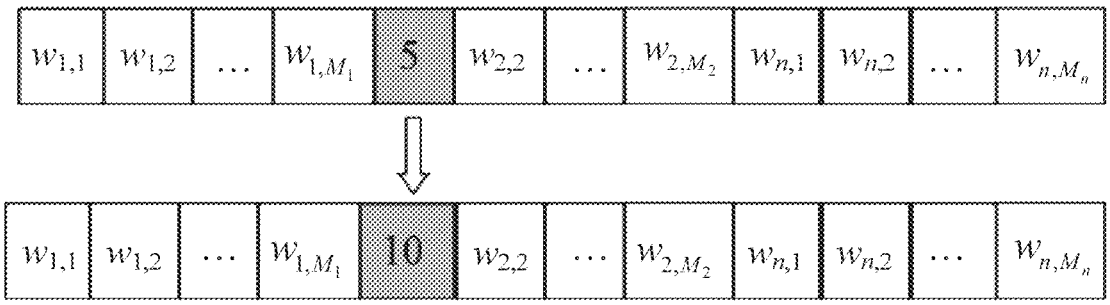
FIG. 14 is a schematic diagram of a genetic mutation process of genetic evolution in a system control method according to an embodiment of the present disclosure.

Mutation (Mutation):

To make an algorithm more exploratory in parameter space, the genetic algorithm provides a method for generating a new solution by means of mutation. A basic idea of mutation is that in a process of evolution, each chromosome has a particular probability of encountering genetic mutation. Genetic mutation may be that one or more gene values in a gene change. As shown in FIG. 14, this figure shows an example of mutation.

The mutation may occur at a random location. Each bit of a chromosome may encounter mutation.

To increase diversity of species, all chromosomes are assigned a same mutation probability, as shown below:

$$p_m(s)=c_m, 0<c_m<1$$

Figure 15:
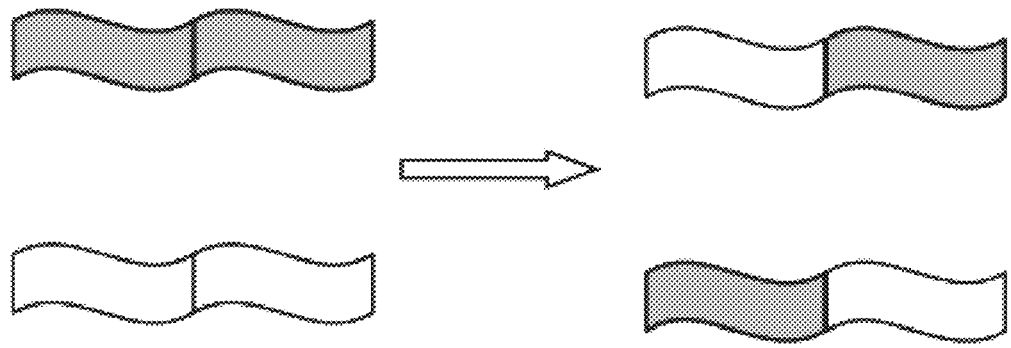
FIG. 15 is a schematic diagram of a genetic crossover process of genetic evolution in a system control method according to an embodiment of the present disclosure.

Crossover (Crossover):

Genetic crossover is also an effective method for making an algorithm more exploratory and achieving survival of the fittest. On one hand, crossover helps create a new chromosome individual, and fitness of the new chromosome individual may be higher than that of a parent body of the new chromosome individual. On the other hand, genetic crossover also helps pass gene fragments with good properties on to a next generation. A process of genetic crossover is that two chromosomes exchange gene fragments. A specific process may be shown in FIG. 15.

Different genetic crossover probabilities are defined for different chromosomes. A chromosome with higher fitness has a greater probability in having genetic crossover with another chromosome. Such a definition helps pass good genes on to the next generation.

$$p_x(s)=c_x f(s), \text{ where}$$

herein, $c_x>0$, and this controls a value of a probability that a chromosome has genetic crossover.

Fitness and how to obtain fitness need to be explained next.

As described above, a control effect is measured according to a deviation between an expected control result and an actual control result of the control system, and the fitness is obtained by converting the control effect.

Assuming that an expected control result of the control system is u(t), and an actual control result that is obtained by decoding a chromosome and further completing system control is y(t), the deviation is expressed as:

$$e(t)=u(t)-y(t), \text{ and}$$

a measurement of the control effect may be expressed as:

$$ISE = \int_{i \in T_k} (y(t)-u(t))^2 dt, \text{ or}$$

$$IAE = \int_{i \in T_k} |y(t)-u(t)| dt, \text{ or}$$

$$ITAE = \int_{i \in T_k} t|y(t)-u(t)| dt, \text{ or}$$

another measurement related to a system state.

A specific operation manner may be:

Step 1: When the system is initialized, assign a same fitness function to all chromosomes. Therefore, all the chromosomes have a same probability that reproduction, mutation, and crossover are performed.

Step 2: After a chromosome is selected from the evolution pool as a control policy (by means of decoding, an ensemble policy is obtained and further a control signal is obtained), control a controlled object by using the control signal. When a control task ends, an actual control effect of the control policy may be obtained, that is, an ISE, an IAE, an ITAE, or the like of the control process is obtained. Based on the measurement of the control effect, a fitness value of the chromosome is correspondingly modified.

Step 3: When a new chromosome individual is obtained through reproduction of the chromosome, assign a same fitness value to the new chromosome individual.

Step 4: When a new chromosome individual is obtained through mutation or crossover of the chromosome, assign an initial fitness value to the new chromosome individual.

In this embodiment of the present disclosure, an ordered evolution operation mainly includes genetic reproduction and genetic crossover, and it is determined, according to fitness of each chromosome, that an evolution operation of genetic reproduction or genetic crossover is to be performed on each chromosome in the evolution pool. However, genetic mutation is an unordered motion in the evolution pool, occurs randomly, and is not affected by the fitness.

In conclusion, this embodiment of the present disclosure provides a control system and a system control method. By means of ensemble learning, multiple algorithms (models) are used for a same function module or for implementing a same preset function. This helps improve a fault tolerance capability and interference immunity of the system. A weighting coefficient of the ensemble learning is encoded by using a chromosome, and a control policy is explored and thoroughly studied by using a genetic algorithm, thereby improving adaptability of the system. A particular quantity (greater than or equal to 2) of chromosomes are maintained in an evolution pool. This helps ensure diversity of control policies. Based on such an adaptability adjustment process, evolution operations are performed on different chromosomes based on continuously updated fitness of the different chromosomes, so that there are gradually a larger quantity of better chromosomes (higher fitness indicating being better) in the evolution pool, and poorer chromosomes are eliminated accordingly, thereby gradually maintaining an elite evolution pool, and further achieving an optimal system control effect.

For ease of understanding the foregoing control system and system control method, the control system is applied to a specific scenario for further description.

Example 1

For example, the application scenario is SDN control. The present disclosure may be applied to the SDN control.

SDN control may be considered as event trigger control. An event is a new-data-flow route request. A controlled object is an entire network. When a new data flow enters the network, a load pressure is caused to the network to some extent, and therefore, this may be considered as external disturbance. A magnitude of the data flow and a magnitude of load caused by the data flow to the network may be predicted by using a particular method. Corresponding control is to select an optimal path for the new data flow, and route and forward the new data flow. A specific implementation method is as follows.

An SDN control system is divided into a new-data-flow length prediction module and a network state estimation and prediction module according to functions. Correspondingly, the control decision ensemble module is specifically: a routing decision module.

A function corresponding to each module described above is implemented by using a different algorithm or model. For example, a function corresponding to a data flow length prediction module may be implemented by using an artificial neural network, or Gaussian process regression, or another method. For the network state estimation and prediction module, multiple autoregressive models may be used to predict utilization of a link. For the routing decision module, a decision may be made by using a method such as Q-learning or reinforcement learning.

When there is a new data flow request, a chromosome is selected from an evolution pool, and the chromosome is decoded to obtain multiple ensemble policies. An ensemble calculation is performed on multiple algorithms in different modules according to different ensemble policies, to obtain a corresponding ensemble control output, and a new data flow is routed and forwarded by using a control signal that is generated according to the ensemble control output.

An evolution pool is maintained in the system, a chromosome is randomly selected from the evolution pool, and a genetic operation is performed on a species by using a genetic operator.

When routing is completed on the data flow, a required time is obtained, and fitness of the chromosome is fed back and modified.

Elite chromosomes in the evolution pool are periodically backed up.

Example 2

For example, the application scenario is an enterprise business performance control system.

The present disclosure may also be applied to enterprise business performance control. The enterprise business performance control may be event trigger control, or may be periodical control. An event may be an economic event of an external society. The controlled object is an enterprise business. A means of control is to adjust a supply quantity of commodities or services of an enterprise in different regions to achieve a business indicator. A specific implementation method is as follows.

An enterprise business performance management system is divided into function modules such as an external event effect prediction module and a regional business prediction module according to functions. Correspondingly, the control decision ensemble module is specifically a business control module.

In each module, a function corresponding to each module is implemented by using a different algorithm or model. For example, a function corresponding to the external event effect prediction module may be implemented by using an artificial neural network, or Gaussian process regression, or another method. For the regional business prediction module, multiple autoregressive models may be used to predict businesses of a next quarter in different regions. For the business control module, for example, a decision may be made, by using a method such as Q-learning or reinforcement learning, on how many resources are to be allocated to a regional business.

When an external event performs trigger control or when a control cycle arrives, a chromosome is selected from an evolution pool, and the chromosome is decoded to obtain a corresponding control policy. An ensemble calculation is performed on multiple algorithms in different modules according to different ensemble policies, to obtain a corresponding ensemble control output, and a new data flow is routed and forwarded by using a control signal that is generated according to the ensemble control output.

An evolution pool is maintained in the system, a chromosome is randomly selected from the evolution pool, and a genetic operation is performed on a species by using a genetic operator.

When the control cycle ends, business performance in the cycle may be obtained, and fitness of the chromosome is fed back and modified.

Elite chromosomes in the evolution pool are periodically backed up.

Embodiment 3: This embodiment of the present disclosure provides a control method applied to the control system described in Embodiment 1. The method includes: receiving a control task; randomly selecting a chromosome from an evolution pool according to the control task, and decoding the chromosome to obtain (N+1) ensemble policies, where the chromosome includes (N+1) gene fragments, the (N+1) gene fragments respectively include ensemble policies that correspond one-to-one to a control decision ensemble module and N function modules in the control system, the evolution pool maintains two or more chromosomes, and N is a positive integer greater than or equal to 1; performing an ensemble calculation respectively according to ensemble policies that correspond one-to-one to the N function modules in the control system, to obtain N calculation outputs; performing an ensemble calculation according to the N calculation outputs and an ensemble policy that corresponds one-to-one to the control decision ensemble module in the control system, to obtain an ensemble control output; and generating a control signal according to the ensemble control output, and controlling the controlled object by using the control signal.

According to the system control method provided in this embodiment of the present disclosure, an evolution pool maintains two or more chromosomes, when a control task is received, a chromosome is randomly selected from the evolution pool and is decoded to obtain (N+1) ensemble policies, an ensemble calculation is performed on algorithms in N function modules according to ensemble policies that correspond one-to-one to the N function modules, to obtain N calculation outputs, further, an ensemble calculation is performed according to the N calculation outputs and an ensemble policy that corresponds one-to-one to a control decision ensemble module, to obtain an ensemble control output, and a control signal is generated according to the ensemble control output, to perform a control operation on a controlled object. This embodiment of the present disclosure proposes, by using a theory of genetic evolution, that an evolution pool maintains multiple chromosomes, different chromosomes may be decoded to obtain different ensemble policies, and a control signal is obtained according to an ensemble policy to complete a control task, so that a complete and dynamic control system is provided for a complex control environment in reality.

Figure 16:
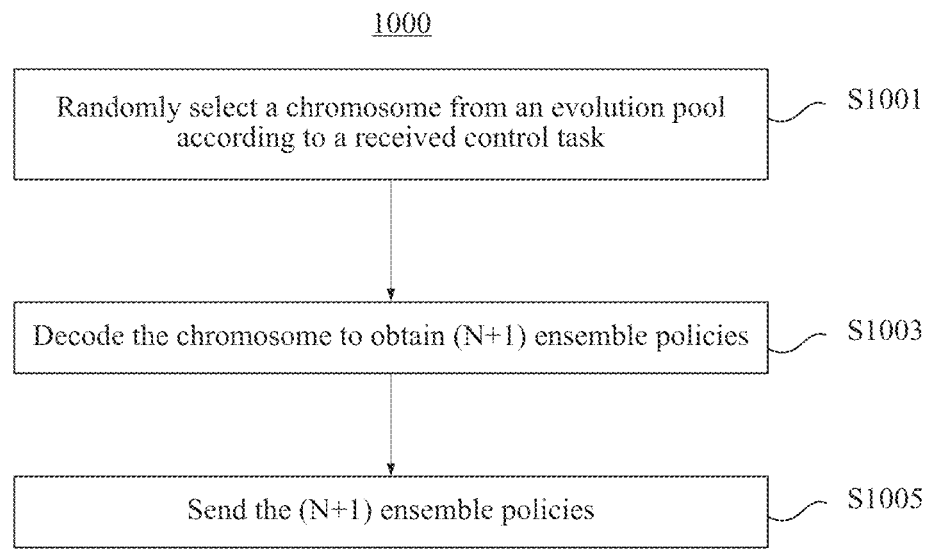
FIG. 16 is another schematic flowchart of a system control method according to an embodiment of the present disclosure.

Embodiment 4: As shown in FIG. 16, FIG. 16 is a schematic flowchart of a system control method 1000 according to an embodiment of the present disclosure.

S1001. Randomly select a chromosome from an evolution pool according to a received control task.

S1003. Decode the chromosome to obtain (N+1) ensemble policies.

The chromosome includes (N+1) gene fragments, each gene fragment uniquely corresponds to an ensemble policy, each ensemble policy uniquely corresponds to a preset function, one ensemble policy is used for assigning a weight to a preset function that uniquely corresponds to the ensemble policy, the evolution pool maintains two or more chromosomes, and N is a positive integer greater than or equal to 1.

S1005. Send the (N+1) ensemble policies.

Optionally, that each gene fragment uniquely corresponds to an ensemble policy, each ensemble policy uniquely corresponds to a preset function, and one ensemble policy is used for assigning a weight to a preset function that uniquely corresponds to the ensemble policy includes:

objects with weights assigned are $M_n$ algorithms, where the $M_n$ algorithms are used for separately and independently implementing the preset function that uniquely corresponds to the ensemble policy; and each ensemble policy includes $M_n$ ensemble calculation weighting coefficients, where the $M_n$ ensemble calculation weighting coefficients are used for respectively assigning weights to the $M_n$ algorithms, $M_n$ is a positive integer greater than or equal to 2, $1 \leq n \leq N$, and n is used for indicating serial numbers of different ensemble policies.

Further, optionally, the method further includes: receiving fitness, where the fitness is obtained by converting a control effect, the control effect is measured according to a deviation between an expected control result and an actual control result of the control system, the fitness is used for indicating a probability that an evolution operation is performed on the chromosome, and the evolution operation includes genetic reproduction or genetic crossover.

According to the system control method 1000 provided in this embodiment of the present disclosure, a chromosome is randomly selected from an evolution pool according to the control task, the chromosome is decoded to obtain (N+1) ensemble policies, an ensemble calculation is performed according to weights assigned by the (N+1) ensemble policies, to obtain an ensemble control output, and further a control signal is generated according to the ensemble control output, to control a controlled object. This embodiment of the present disclosure proposes, by using a theory of genetic evolution, that an evolution pool maintains multiple chromosomes, different chromosomes may be decoded to obtain different ensemble policies, and a control signal is obtained according to an ensemble policy to complete a control task, so that a complete and dynamic system control method is provided for a complex control environment in reality.

Figure 17:
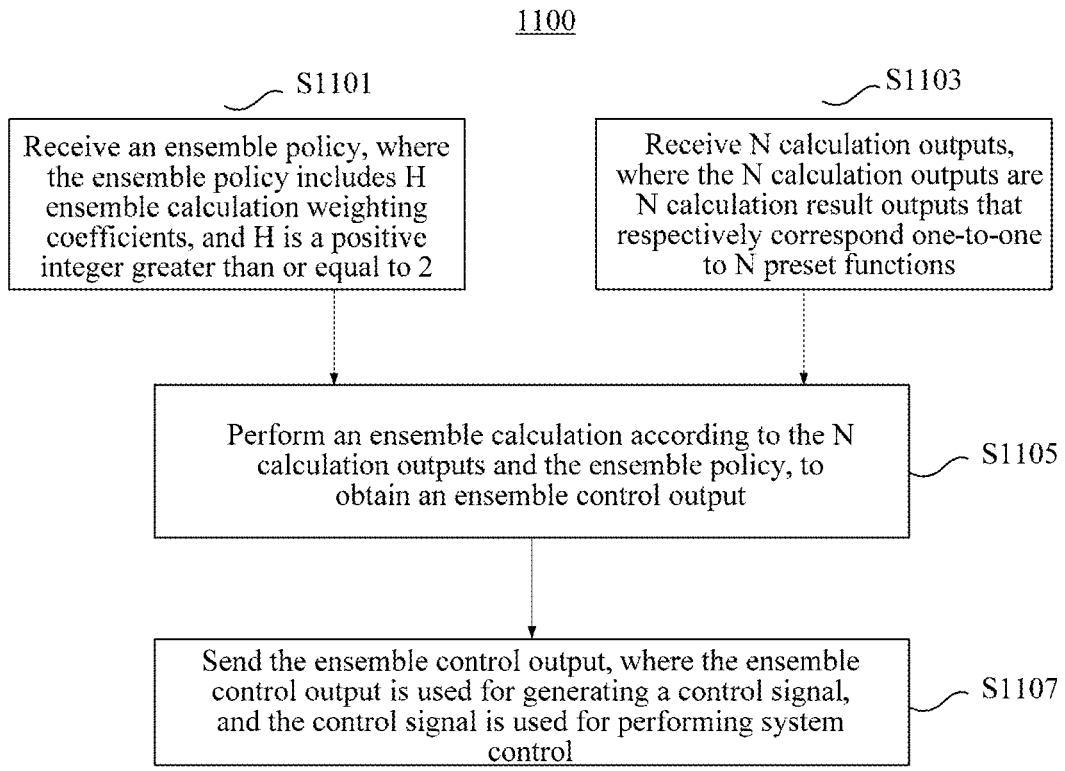
FIG. 17 is still another schematic flowchart of a system control method according to an embodiment of the present disclosure.

Embodiment 5: As shown in FIG. 17, FIG. 17 is a schematic flowchart of a system control method 1100 according to an embodiment of the present disclosure.

S1101. Receive an ensemble policy, where the ensemble policy includes H ensemble calculation weighting coefficients, and H is a positive integer greater than or equal to 2.

S1103. Receive N calculation outputs, where the N calculation outputs are N calculation result outputs that respectively correspond one-to-one to N preset functions.

S1105. Perform an ensemble calculation according to the N calculation outputs and the ensemble policy, to obtain an ensemble control output.

S1107. Send the ensemble control output, where the ensemble control output is used for generating a control signal, and the control signal is used for performing system control.

Optionally, the H ensemble calculation weighting coefficients are specifically used for respectively assigning weights to H algorithms, and the H algorithms are used for separately and independently performing calculations to obtain the ensemble control output; and the performing an ensemble calculation according to the N calculation outputs and the ensemble policy, to obtain an ensemble control output includes: performing calculations on the N calculation outputs respectively according to the H algorithms, to obtain H control outputs; and performing a weighted ensemble calculation on the H control outputs according to the H ensemble calculation weighting coefficients included in the ensemble policy, to obtain the ensemble control output.

Further, optionally, the method further includes: feeding back a control effect that is obtained according to control of the control signal, where the control effect is measured according to a deviation between an expected control result and an actual control result of the control system, the control effect is used for being converted into fitness of the chromosome, the fitness is used for indicating a probability that an evolution operation is performed on the chromosome, and the evolution operation includes genetic reproduction or genetic crossover.

According to the system control method 1100 provided in this embodiment of the present disclosure, an ensemble calculation is performed according to a received ensemble policy and N received calculation outputs and according to a weight assigned by the ensemble policy, to obtain an ensemble control output, and further a control signal is generated according to the ensemble control output, to control a controlled object. This embodiment of the present disclosure proposes, by using a theory of genetic evolution, that an evolution pool maintains multiple chromosomes, different chromosomes may be decoded to obtain different ensemble policies, and a control signal is obtained according to an ensemble policy to complete a control task, so that a complete and dynamic system control method is provided for a complex control environment in reality.

Figure 18:
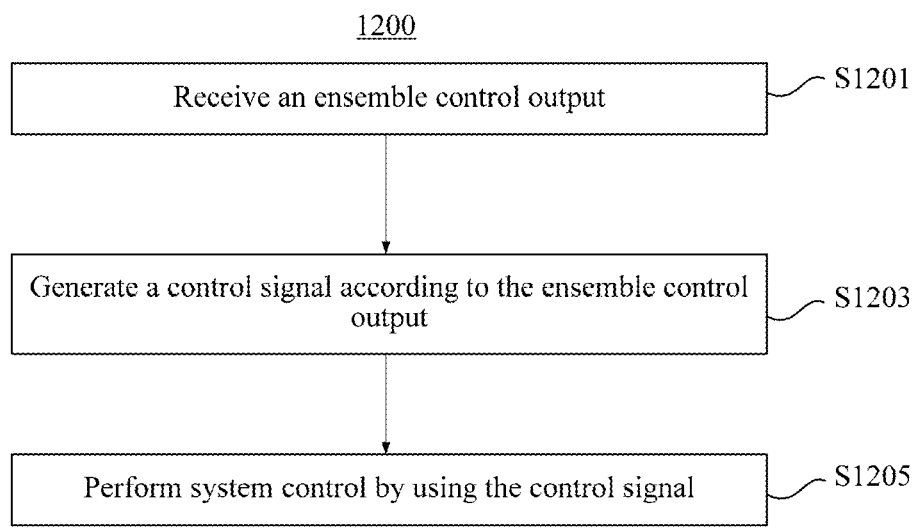
FIG. 18 is still another schematic flowchart of a system control method according to an embodiment of the present disclosure.

Embodiment 6: As shown in FIG. 18, FIG. 18 is a schematic flowchart of a system control method 1200 according to an embodiment of the present disclosure.

S1201. Receive an ensemble control output.

The ensemble control output is obtained by assigning weights to H algorithms according to H ensemble calculation weighting coefficients and performing a weighted ensemble calculation according to the H ensemble calculation weighting coefficients, the H algorithms are used for separately and independently performing calculations to obtain the ensemble control output, and H is a positive integer greater than or equal to 2.

S1203. Generate a control signal according to the ensemble control output.

S1205. Perform system control by using the control signal.

Optionally, the method further includes: collecting a control effect that is obtained according to control of the control signal, where the control effect is measured according to a deviation between an expected control result and an actual control result of the control system; converting the control effect into fitness of the chromosome, where the fitness is used for indicating a probability that an evolution operation is performed on the chromosome, and the evolution operation includes genetic reproduction or genetic crossover; and sending the fitness.

According to the system control method 1200 provided in this embodiment of the present disclosure, an ensemble control output is received, and further a control signal is generated according to the ensemble control output, to control a controlled object. This embodiment of the present disclosure proposes, by using a theory of genetic evolution, that an evolution pool maintains multiple chromosomes, different chromosomes may be decoded to obtain different ensemble policies, and a control signal is obtained according to an ensemble policy to complete a control task, so that a complete and dynamic system control method is provided for a complex control environment in reality.

The methods 1000, 1100, and 1200 shown in FIG. 16, FIG. 17, and FIG. 18 can be implemented in the control system 300 shown in the foregoing embodiment. To avoid repetition, details are not described herein.

Embodiment 7: This embodiment of the present disclosure provides a control method applied to the control system described in Embodiment 1, where the control method includes:

randomly selecting a chromosome from an evolution pool according to a received control task;

decoding the chromosome to obtain (N+1) ensemble policies, where the chromosome includes (N+1) gene fragments, the (N+1) gene fragments respectively include ensemble policies that correspond one-to-one to a control decision ensemble module and N function modules in the control system, the evolution pool maintains two or more chromosomes, and N is a positive integer greater than or equal to 1; and sending the (N+1) ensemble policies, so that the control system performs ensemble control according to the (N+1) ensemble policies.

According to the system control method provided in this embodiment of the present disclosure, an evolution pool maintains two or more chromosomes, when a control task is received, a chromosome is randomly selected from the evolution pool and is decoded to obtain (N+1) ensemble policies, and the (N+1) ensemble policies are sent, so that the control system performs ensemble control according to the (N+1) ensemble policies. This embodiment of the present disclosure proposes, by using a theory of genetic evolution, that an evolution pool maintains multiple chromosomes, different chromosomes may be decoded to obtain different ensemble policies, and a control signal is obtained according to an ensemble policy to complete a control task, so that a complete and dynamic control system is provided for a complex control environment in reality.

Embodiment 8: This embodiment of the present disclosure provides a control method applied to the control system described in Embodiment 1, where the control method includes:

receiving, by a control decision ensemble module, an ensemble policy that corresponds one-to-one to the control decision ensemble module;

receiving, by the control decision ensemble module, N calculation outputs sent by N function modules in the control system;

performing an ensemble calculation according to the N calculation outputs and the ensemble policy that corresponds one-to-one to the control decision ensemble module, to obtain an ensemble control output; and sending the ensemble control output, so that a controller in the control system generates a control signal according to the ensemble control output, where the control signal is used for controlling a controlled object in the control system.

According to the system control method provided in this embodiment of the present disclosure, (N+1) ensemble policies and N calculation outputs are received, further an ensemble calculation is performed according to the N calculation outputs and an ensemble policy that corresponds one-to-one to a control decision ensemble module, to obtain an ensemble control output, and a control signal is generated according to the ensemble control output, to perform a control operation on a controlled object. This embodiment of the present disclosure proposes, by using a theory of genetic evolution, that an evolution pool maintains multiple chromosomes, different chromosomes may be decoded to obtain different ensemble policies, and a control signal is obtained according to an ensemble policy to complete a control task, so that a complete and dynamic control system is provided for a complex control environment in reality.

Embodiment 9: This embodiment of the present disclosure provides a control method applied to the control system described in Embodiment 1, where the control method includes:

receiving an ensemble control output sent by a control decision ensemble module;

generating a control signal according to the ensemble control output; and controlling a controlled object in the control system by using the control signal.

According to the system control method provided in this embodiment of the present disclosure, an ensemble control output is received, and a control signal is generated according to the ensemble control output to perform a control operation on a controlled object. This embodiment of the present disclosure proposes, by using a theory of genetic evolution, that an evolution pool maintains multiple chromosomes, different chromosomes may be decoded to obtain different ensemble policies, and a control signal is obtained according to an ensemble policy to complete a control task, so that a complete and dynamic control system is provided for a complex control environment in reality.

Embodiment 10: This embodiment of the present disclosure provides a control apparatus, where the apparatus includes a genetic evolution module.

The genetic evolution module is configured to: randomly select a chromosome from an evolution pool according to a received control task; decode the chromosome to obtain (N+1) ensemble policies, where the chromosome includes (N+1) gene fragments, each gene fragment uniquely corresponds to an ensemble policy, each ensemble policy uniquely corresponds to a preset function, one ensemble policy is used for assigning a weight to a preset function that uniquely corresponds to the ensemble policy, the evolution pool maintains two or more chromosomes, and N is a positive integer greater than or equal to 1; and send the (N+1) ensemble policies.

Specifically, that each gene fragment uniquely corresponds to an ensemble policy, each ensemble policy uniquely corresponds to a preset function, and one ensemble policy is used for assigning a weight to a preset function that uniquely corresponds to the ensemble policy includes: objects with weights assigned are $M_n$ algorithms, where the $M_n$ algorithms are used for separately and independently implementing the preset function that uniquely corresponds to the ensemble policy; and each ensemble policy includes $M_n$ ensemble calculation weighting coefficients, where the $M_n$ ensemble calculation weighting coefficients are used for respectively assigning the weights to the $M_n$ algorithms, $M_n$ is a positive integer greater than or equal to 2, $1 \le n \le N$, and n is used for indicating serial numbers of different ensemble policies.

The genetic evolution module may be further configured to: receive fitness, where the fitness is obtained by converting a control effect, the control effect is measured according to a deviation between an expected control result and an actual control result of the control system, the fitness is used for indicating a probability that an evolution operation is performed on the chromosome, and the evolution operation includes genetic reproduction or genetic crossover.

According to the control apparatus provided in this embodiment of the present disclosure, a chromosome is randomly selected from an evolution pool according to the control task, the chromosome is decoded to obtain (N+1) ensemble policies, an ensemble calculation is performed according to weights assigned by the (N+1) ensemble policies, to obtain an ensemble control output, and further a control signal is generated according to the ensemble control output, to control a controlled object. This embodiment of the present disclosure proposes, by using a theory of genetic evolution, that an evolution pool maintains multiple chromosomes, different chromosomes may be decoded to obtain different ensemble policies, and a control signal is obtained according to an ensemble policy to complete a control task, so that a complete and dynamic system control apparatus is provided for a complex control environment in reality.

Embodiment 11: This embodiment of the present disclosure provides a control apparatus, where the apparatus includes a control decision ensemble module.

The control decision ensemble module is configured to:

receive an ensemble policy, where the ensemble policy includes H ensemble calculation weighting coefficients, and H is a positive integer greater than or equal to 2; receive N calculation outputs, where the N calculation outputs are N calculation result outputs that respectively correspond one-to-one to N preset functions; perform an ensemble calculation according to the N calculation outputs and the ensemble policy, to obtain an ensemble control output; and send the ensemble control output, where the ensemble control output is used for generating a control signal, and the control signal is used for performing system control.

Further, the control decision ensemble module is configured to: separately assign weights to H algorithms according to the H ensemble calculation weighting coefficients, where the H algorithms are used for separately and independently performing calculations to obtain the ensemble control output; perform calculations on the N calculation outputs respectively according to the H algorithms, to obtain H control outputs; and perform a weighted ensemble calculation on the H control outputs according to the H ensemble calculation weighting coefficients included in the ensemble policy, to obtain the ensemble control output.

Specifically, the control decision ensemble module is further configured to: feed back a control effect that is obtained according to control of the control signal, where the control effect is measured according to a deviation between an expected control result and an actual control result of the control system, the control effect is used for being converted into fitness of the chromosome, the fitness is used for indicating a probability that an evolution operation is performed on the chromosome, and the evolution operation includes genetic reproduction or genetic crossover.

According to the control apparatus provided in this embodiment of the present disclosure, an ensemble calculation is performed according to a received ensemble policy and N received calculation outputs and according to a weight assigned by the ensemble policy, to obtain an ensemble control output, and further a control signal is generated according to the ensemble control output, to control a controlled object. This embodiment of the present disclosure proposes, by using a theory of genetic evolution, that an evolution pool maintains multiple chromosomes, different chromosomes may be decoded to obtain different ensemble policies, and a control signal is obtained according to an ensemble policy to complete a control task, so that a complete and dynamic system control apparatus is provided for a complex control environment in reality.

Embodiment 12: This embodiment of the present disclosure provides a controller.

The controller is configured to: receive an ensemble control output, where the ensemble control output is obtained by assigning weights to H algorithms according to H ensemble calculation weighting coefficients and performing a weighted ensemble calculation according to the H ensemble calculation weighting coefficients, the H algorithms are used for separately and independently performing calculations to obtain the ensemble control output, and H is a positive integer greater than or equal to 2; generate a control signal according to the ensemble control output; and perform system control by using the control signal.

Further, the controller may be further configured to:

collect a control effect that is obtained according to control of the control signal, where the control effect is measured according to a deviation between an expected control result and an actual control result of the control system; convert the control effect into fitness of the chromosome, where the fitness is used for indicating a probability that an evolution operation is performed on the chromosome, and the evolution operation includes genetic reproduction or genetic crossover; and send the fitness.

The controller provided in this embodiment of the present disclosure receives an ensemble control output, and further generates a control signal according to the ensemble control output, to control a controlled object. This embodiment of the present disclosure proposes, by using a theory of genetic evolution, that an evolution pool maintains multiple chromosomes, different chromosomes may be decoded to obtain different ensemble policies, and a control signal is obtained according to an ensemble policy to complete a control task, so that a complete and dynamic system control method is provided for a complex control environment in reality.

The control apparatuses described in Embodiment 10, Embodiment 11, and Embodiment 12 may be included in the control system 300 shown in the foregoing embodiment. To avoid repetition, details are not described herein.

The control apparatuses described in Embodiment 10, Embodiment 11, and Embodiment 12 may use the system control methods 900, 1000, 1100, and 1200 shown in the foregoing embodiments. To avoid repetition, details are not described herein.

Figure 19:
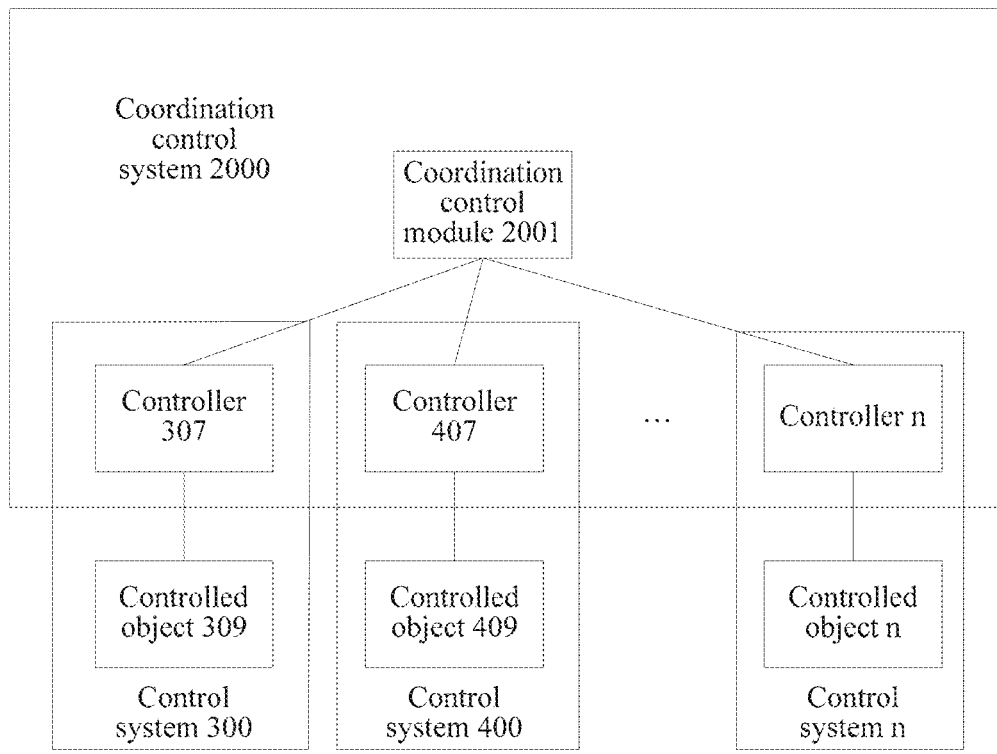
FIG. 19 is a structural block diagram of a multi-controller coordination control system according to an embodiment of the present disclosure.

Embodiment 13: As shown in FIG. 19, FIG. 19 shows a multi-controller coordination control system 2000 according to an embodiment of the present disclosure.

Figure 20:
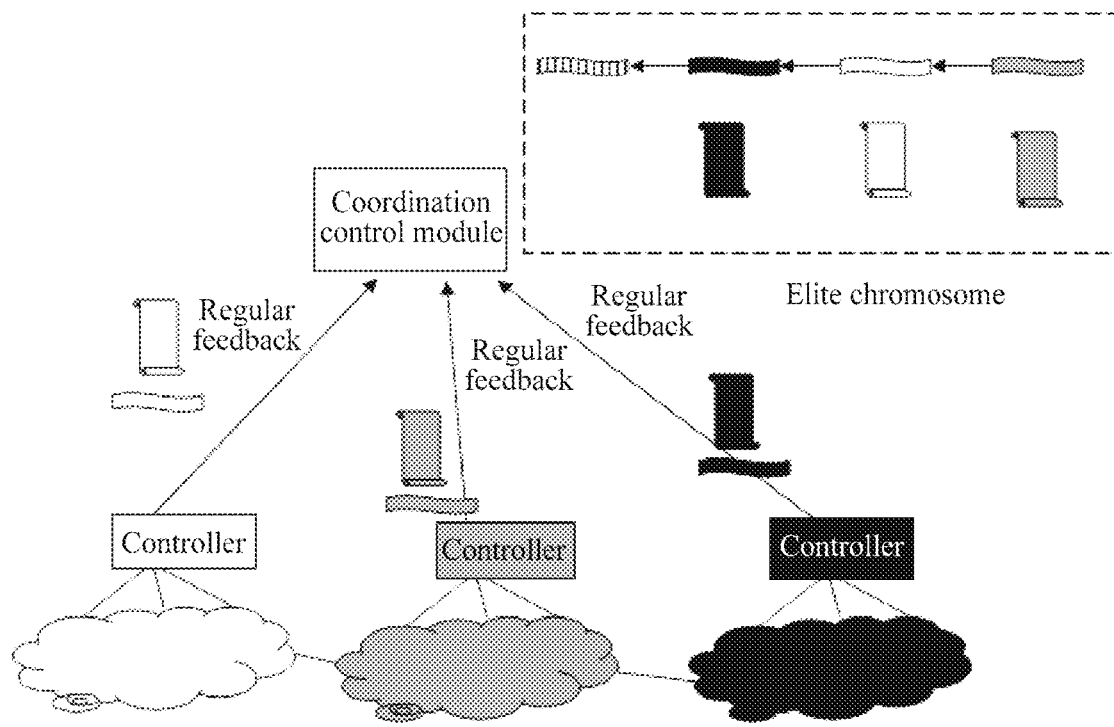
FIG. 20 is a schematic diagram of a working process of a multi-controller coordination control system according to an embodiment of the present disclosure.

The coordination control system 2000 includes controllers in R control systems according to any one of embodiment 1 or all related embodiments, where the multi-controller coordination control system further includes:

as shown in FIG. 20, a coordination control module 2001, configured to: receive elite chromosomes of the R (which is 3 in an example in the figure) control systems, to obtain R elite chromosomes, where the elite chromosome includes a chromosome, with highest fitness, maintained in an evolution pool of each of the R control systems; sort the R elite chromosomes according to similarities of the R elite chromosomes, to obtain an elite chromosome sorted linked list; and enable a fault tolerance policy when the coordination control module does not receive an elite chromosome of any one of the R control systems within a first preset period, where the fault tolerance policy includes: performing, according to the elite chromosome sorted linked list, fault tolerance processing on the control system whose elite chromosome is not received within the first preset period, where R is a positive integer greater than or equal to 2.

Optionally, when the coordination control module does not receive an elite chromosome of any one of the R control systems within the first preset period, the coordination control module 2001 may first send a warning to the control system whose elite chromosome is not received within the first preset period, and if the elite chromosome of the control system is still not received within a second preset period starting from a moment at which the warning is sent, enable the fault tolerance policy.

Based on the foregoing solution, further, optionally, before the enabling a fault tolerance policy, the coordination control module 2001 is further configured to: determine that a controller in the control system whose elite chromosome is not received within the first preset period or the second preset period encounters a fault; and determine a cause for the fault of the controller, where the cause for the fault of the controller includes a software error or a hardware error.

Figure 21:
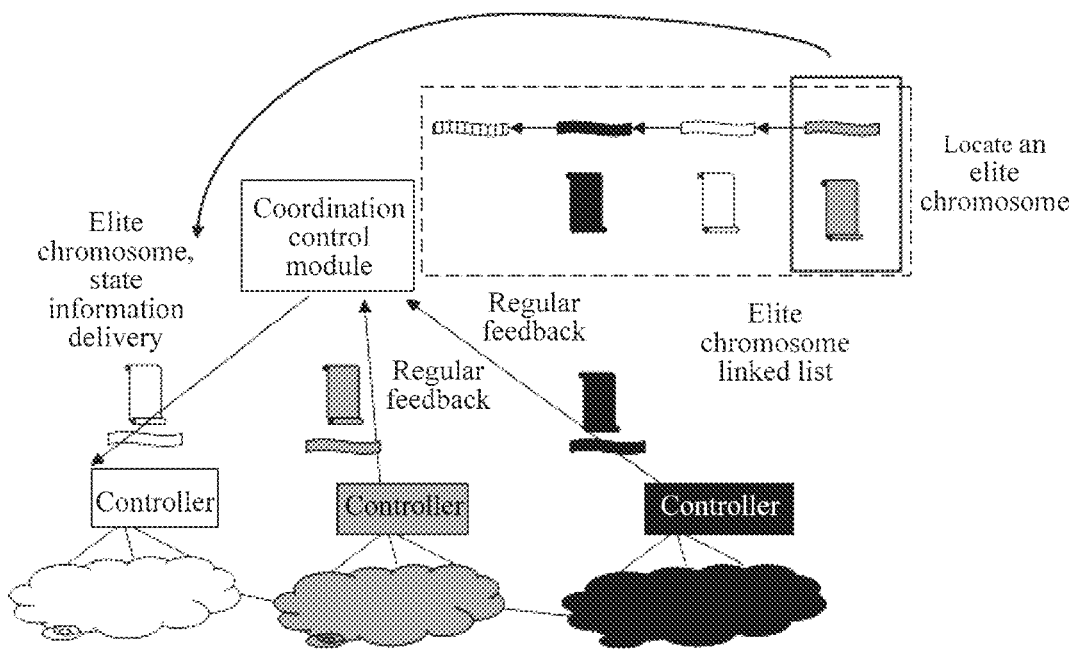
FIG. 21 is a schematic diagram of a processing process when a software error occurs in a multi-controller coordination control system according to an embodiment of the present disclosure.

As shown in FIG. 21, if the cause for the fault of the controller is a software error, the enabling, by the coordination control module, the fault tolerance policy specifically includes:

obtaining, according to the elite chromosome sorted linked list, an elite chromosome that uniquely corresponds to the faulty controller, and sending the elite chromosome that uniquely corresponds to the faulty controller to the faulty controller, so as to respond to a system operation of the faulty controller.

Figure 22:
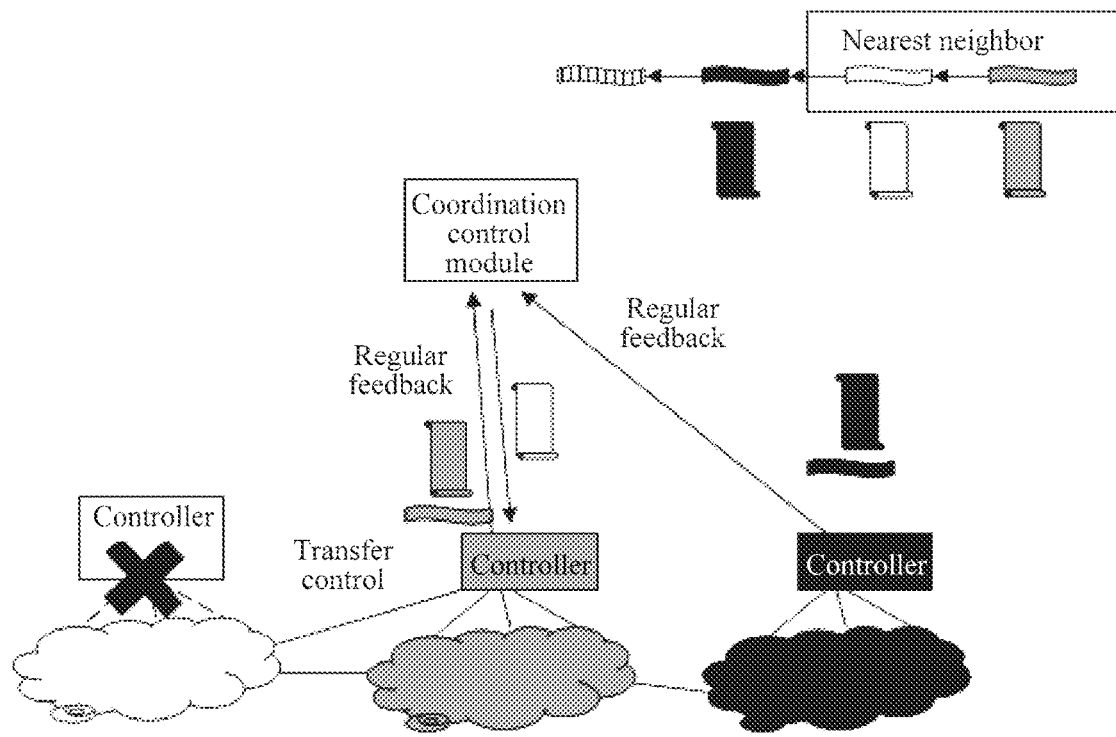
FIG. 22 is a schematic diagram of a processing process when a hardware error occurs in a multi-controller coordination control system according to an embodiment of the present disclosure.

As shown in FIG. 22, if the cause for the fault of the controller is a hardware error, the enabling, by the coordination control module, the fault tolerance policy specifically includes:

searching for K nearest neighbors according to the elite chromosome sorted linked list, to obtain K controllers that have a control policy similar to a control policy of the faulty controller; and enabling the K controllers that have the control policy similar to the control policy of the faulty controller to take over a task of the faulty controller.

In a case of a large control system, if a single controller performs processing, a huge workload and a time delay are caused. In addition, if the single controller encounters an error, the entire control system encounters a breakdown. Therefore, the present disclosure provides a solution in which the entire control system (that is, the multi-controller coordination control system 2000) is divided into multiple control subsystems (for example: control system 300). A controller is allocated to each control subsystem. Different controllers are coordinated by a controller coordinator (controller coordinator) (that is, the foregoing coordination control module 2001). A controller in each control subsystem periodically sends elite chromosomes (elite policies) and related information about a controlled object to the controller coordinator to perform data backup. The controller coordinator sorts, according to similarities of the elite chromosomes, the elite chromosomes in a form of a linked list (linked list), and maintains the elite chromosomes. If the controller coordinator does not receive a data backup from a controller within a particular time period, the controller coordinator sends a warning (warning) to the controller. If the controller coordinator still does not receive any data backup within a particular time period, the controller coordinator determines that the controller is not reachable (not reachable). The system enables a fault tolerance policy.

There are generally two possible cases in which the controller encounters a fault. In one case, a software error or a process error occurs. In the other case, a hardware error occurs. For these two different cases of errors, a solution of the present disclosure provides a different system recovery operation. When a controller of a control subsystem encounters a software or process error, the controller coordinator only needs to obtain elite chromosomes and backed up status information of a controlled object of the control subsystem from the elite chromosome linked list, and re-deliver the elite chromosomes and the backed up status information of the controlled object to the faulty sub-controller. When elite chromosomes regenerate a species in the evolution pool, the control subsystem can be restarted.

Figure 23:
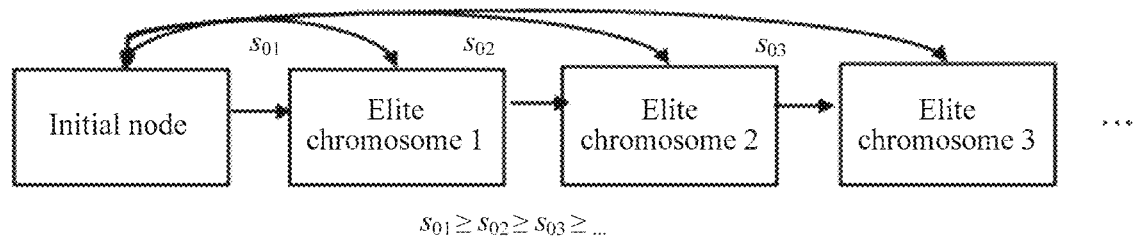
FIG. 23 is a maintenance diagram of an elite chromosome linked list of a multi-controller coordination control system according to an embodiment of the present disclosure.

Specifically, an objective of maintaining an elite chromosome linked list is to find K controllers having similar control policies quickly. As shown in FIG. 23, when an elite chromosome linked list is created, an initial node is a chromosome whose ensemble weight is 1. When a new elite chromosome is added to the linked list, a similarity between the new elite chromosome and the initial node is calculated. A higher similarity indicates a shorter distance between the newly added elite chromosome and the initial node. Therefore, all elite chromosomes are sorted according to similarities between the elite chromosomes and the initial node.

When a controller of a control subsystem encounters a hardware error, a location of an elite chromosome of the control subsystem is locked up first, and then K nearest neighbors of the elite chromosome are found. Controllers corresponding to the K nearest neighbor elite chromosomes take over a control task of the faulty control subsystem.

When an elite chromosome linked list is created, sorting needs to be performed according to similarities. Each elite chromosome is a weight vector. Therefore, a similarity between elite chromosomes may be defined as a cosine similarity between two vectors.

Assuming that an ensemble weight vector represented by the initial node is $P_0$, and an ensemble weight vector of a new elite chromosome that needs to be added is $P_i$, a similarity between the two is expressed as:

$$s_{0i} = \frac{P_0^T P_i}{\sqrt{P_0^T P_0} \sqrt{P_i^T P_i}}.$$

Figure 24:
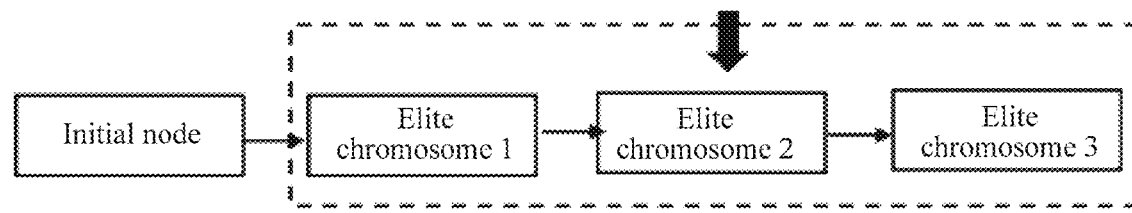
FIG. 24 is a schematic diagram of locating K nearest neighbor elite chromosomes in a multi-controller coordination control system according to an embodiment of the present disclosure.

When a controller of a control subsystem encounters a hardware error, backup controllers are selected to take over a control task of the control subsystem. As described above, as shown in FIG. 24, an elite chromosome of the control subsystem is located, and then backup controllers are selected by finding K nearest neighbors (K nearest neighbors) of the elite chromosome. These backup controllers take over the control task.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of the present disclosure.

It may be clearly understood by a person skilled in the art that, for the purpose of convenient and brief description, for a detailed working process of the foregoing system, apparatus, and unit, reference may be made to a corresponding process in the foregoing method embodiments, and details are not described.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual needs to achieve the objectives of the solutions of the embodiments.

In addition, functional units in the embodiments of the present disclosure may be integrated into one processing unit, or each of the units may exist alone physically, or two or more units are integrated into one unit.

When the functions are implemented in the form of a software functional unit and sold or used as an independent product, the functions may be stored in a computer-readable storage medium. Based on such an understanding, the technical solutions of the present disclosure essentially, or the part contributing to the prior art, or some of the technical solutions may be implemented in a form of a software product. The software product is stored in a storage medium and includes several instructions for instructing a computer device (which may be a personal computer, a server, or a network device) or a processor to perform all or some of the steps of the methods described in the embodiments of the present disclosure. The foregoing storage medium includes: any medium that can store program code, such as a USB flash drive, a removable hard disk, a read-only memory (ROM, Read-Only Memory), a random access memory (RAM, Random Access Memory), a magnetic disk, or an optical disc.

The foregoing descriptions are merely specific embodiments of the present disclosure, but are not intended to limit the protection scope of the present disclosure. Any variation or replacement readily figured out by a person skilled in the art within the technical scope disclosed in the present disclosure shall fall within the protection scope of the present disclosure. Therefore, the protection scope of the present disclosure shall be subject to the protection scope of the claims.

What is claimed is:

1. A control system, wherein the control system comprises a receiver, a genetic evolution module, a control decision ensemble module, N function modules, a controller, and a controlled object, wherein
   the receiver is configured to receive a control task;
   the controller is configured to implement:
      randomly select a chromosome from an evolution pool according to the control task, wherein the chromosome comprises (N+1) gene fragments, wherein the (N+1) gene fragments respectively comprise ensemble policies that correspond one-to-one to the control decision ensemble module and the N function modules, wherein the evolution pool maintains two or more chromosomes, and wherein N is a positive integer greater than or equal to 1;
      decode the chromosome to obtain (N+1) ensemble policies;
      perform an ensemble calculation respectively according to ensemble policies that correspond one-to-one to the N function module to obtain N calculation outputs;
      perform an ensemble calculation according to the N calculation outputs and an ensemble policy that corresponds one-to-one to the control decision ensemble module to obtain an ensemble control output;
      generate a control signal according to the ensemble control output; and
      control the controlled object by using the control signal,
   wherein the control decision ensemble module comprises H algorithms, wherein the H algorithms are used for separately and independently implementing a function of the control decision ensemble module, and wherein H is a positive integer greater than or equal to 2.

2. The system according to claim 1, wherein an $n^{th}$ function module of the N function modules comprises $M_n$ algorithms, wherein $M_n$ is a positive integer greater than or equal to 2, wherein $1 \leq n \leq N$, wherein the $M_n$ algorithms are used for separately and independently implementing a specific function of the function module, and wherein the $n^{th}$ function module is any one of the N function modules; and
   wherein the N function modules are configured to perform an ensemble calculation respectively according to ensemble policies that correspond one-to-one to the N function modules to obtain N calculation outputs comprises:
      the $n^{th}$ function module is configured to perform an ensemble calculation on the $M_n$ algorithms according to an ensemble policy that corresponds one-to-one to the $n^{th}$ function module to obtain one calculation output.

3. The system according to claim 2, wherein the $n^{th}$ ensemble policy of the (N+1) ensemble policies that corresponds one-to-one to the $n^{th}$ function module comprises $M_n$ ensemble calculation weighting coefficients, and wherein the $M_n$ ensemble calculation weighting coefficients are used for respectively assigning weights to the $M_n$ algorithms comprised in the $n^{th}$ function module.

4. The system according to claim 3, wherein the $n^{th}$ function module of the N function modules is configured to:
   perform calculations respectively according to the $M_n$ algorithms comprised in the $n^{th}$ function module to obtain $M_n$ calculation results; and
   perform a weighted ensemble calculation on the $M_n$ calculation results according to the $M_n$ ensemble calculation weighting coefficients comprised in the $n^{th}$ ensemble policy to obtain one calculation output.

5. The system according to claim 2, wherein if N=1, and n=1, the N function modules are a controlled object state estimation/prediction ensemble module; and
wherein the controlled object state estimation/prediction ensemble module comprises $M_1$ first algorithms, wherein the $M_1$ first algorithms are used for separately and independently implementing a function of estimating/predicting a state of the controlled object.

6. The system according to claim 2, wherein if N=2, and n=1 or 2, the N function modules are respectively a controlled object state estimation/prediction ensemble module and an external event or interference prediction/classification ensemble module;
wherein the controlled object state estimation/prediction ensemble module comprises $M_1$ first algorithms, wherein the $M_1$ first algorithms are used for separately and independently implementing a function of estimating/predicting a state of the controlled object; and
wherein the external event or interference prediction/classification ensemble module comprises $M_2$ second algorithms, wherein the $M_2$ second algorithms are used for separately and independently implementing a function of predicting or classifying an external event or interference.

7. The system according to claim 1, wherein the ensemble policy of the (N+1) ensemble policies that corresponds one-to-one to the control decision ensemble module comprises H ensemble calculation weighting coefficients, and wherein the H ensemble calculation weighting coefficients are used for respectively assigning weights to the H algorithms comprised in the control decision ensemble module.

8. The system according to claim 7, wherein the control decision ensemble module is configured to:
perform calculations on the N calculation outputs respectively according to the H algorithms comprised in the control decision ensemble module to obtain H control outputs; and
perform a weighted ensemble calculation on the H control outputs according to the H ensemble calculation weighting coefficients comprised in the ensemble policy that corresponds one-to-one to the control decision ensemble module to obtain the ensemble control output.

9. The system according to claim 1, wherein the controller is further configured, when the control task ends, to:
collect a control effect that is obtained according to control of the control signal, wherein the control effect is measured according to a deviation between an expected control result and an actual control result of the control system;
convert the control effect into fitness of the chromosome, wherein the fitness is used for indicating a probability that an evolution operation is performed on the chromosome; and
send the fitness to the genetic evolution module, wherein the genetic evolution module performs an evolution operation on the chromosome according to the fitness, wherein the evolution operation comprises genetic reproduction or genetic crossover.

10. A system control method, wherein the method comprises:
receiving a control task;
randomly selecting a chromosome from an evolution pool according to the control task, wherein the chromosome comprises (N+1) gene fragments, wherein each gene fragment uniquely corresponds to an ensemble policy, wherein each ensemble policy uniquely corresponds to a preset function, wherein one ensemble policy is used for assigning a weight to a preset function that uniquely corresponds to the ensemble policy, wherein the evolution pool maintains two or more chromosomes, and wherein N is a positive integer greater than or equal to 1;
decoding the chromosome to obtain (N+1) ensemble policies;
performing, according to H algorithms, an ensemble calculation according to weights assigned by the (N+1) ensemble policies to obtain an ensemble control output, wherein the H algorithms are used for separately and independently implementing a function of a control decision ensemble module, and H is a positive integer greater than or equal to 2; and
generating a control signal according to the ensemble control output, wherein the control signal is used for performing system control.

11. The method according to claim 10, wherein the performing the ensemble calculation according to weights assigned by the (N+1) ensemble policies to obtain an ensemble control output comprises:
separately performing calculations according to weights assigned by N of the (N+1) ensemble policies to obtain N calculation outputs; and
performing an ensemble calculation according to the N calculation outputs and one of the (N+1) ensemble policies other than the N ensemble policies to obtain the ensemble control output.

12. The method according to claim 11, wherein that each gene fragment uniquely corresponds to an ensemble policy, wherein each ensemble policy uniquely corresponds to a preset function, and wherein one ensemble policy is used for assigning a weight to a preset function that uniquely corresponds to the ensemble policy comprises:
objects with weights assigned are $M_n$ algorithms, wherein the $M_n$ algorithms are used for separately and independently implementing the preset function that uniquely corresponds to the ensemble policy; and
each ensemble policy comprises $M_n$ ensemble calculation weighting coefficients, wherein the $M_n$ ensemble calculation weighting coefficients are used for respectively assigning the weights to the $M_n$ algorithms, wherein $M_n$ is a positive integer greater than or equal to 2, wherein $1 \leq n \leq N$, and wherein n is used for indicating serial numbers of different ensemble policies.

13. The method according to claim 12, wherein the separately performing calculations according to weights assigned by N of the (N+1) ensemble policies to obtain N calculation outputs comprises:
performing the following step for the $n^{th}$ ensemble policy of the N ensemble policies:
performing a weighted ensemble calculation on the $M_n$ algorithms according to the $M_n$ ensemble calculation weighting coefficients to obtain one calculation output, wherein the one calculation output is used for indicating an output of a preset function that uniquely corresponds to the $n^{th}$ ensemble policy, and wherein the $n^{th}$ ensemble policy is any one of the N ensemble policies.

14. The method according to claim 10, wherein after the generating a control signal according to the ensemble control output, the method further comprises:
collecting a control effect that is obtained according to control of the control signal, wherein the control effect is measured according to a deviation between an expected control result and an actual control result of a control system; and converting the control effect into fitness of the chromosome, wherein the fitness is used for indicating a probability that an evolution operation is performed on the chromosome, and wherein the evolution operation comprises genetic reproduction or genetic crossover.

15. A system control method, applied to a control system comprising a receiver, a genetic evolution module, a control decision ensemble module, N function modules, a controller, and a controlled object, wherein the method comprises:

receiving a control task;

randomly selecting a chromosome from an evolution pool according to the control task, wherein the chromosome comprises (N+1) gene fragments, wherein the (N+1) gene fragments respectively comprise ensemble policies that correspond one-to-one to the control decision ensemble module and the N function modules in the control system, wherein the evolution pool maintains two or more chromosomes, and wherein N is a positive integer greater than or equal to 1;

decoding the chromosome to obtain (N+1) ensemble policies;

performing an ensemble calculation respectively according to ensemble policies that correspond one-to-one to the N function modules in the control system to obtain N calculation outputs;

performing, according to H algorithms, an ensemble calculation according to the N calculation outputs and an ensemble policy that corresponds one-to-one to the control decision ensemble module in the control system to obtain an ensemble control output, wherein the H algorithms are used for separately and independently implementing a function of the control decision ensemble module, and H is a positive integer greater than or equal to 2;

generating a control signal according to the ensemble control output; and controlling the controlled object by using the control signal.

* * * * *